(12) United States Patent
Chung et al.

(10) Patent No.: US 12,038,309 B2
(45) Date of Patent: Jul. 16, 2024

(54) ULTRASENSITIVE CAPACITIVE SENSOR COMPOSED OF NANOSTRUCTURED ELECTRODES

(71) Applicant: University of Washington, Seattle, WA (US)

(72) Inventors: Jae-Hyun Chung, Seattle, WA (US); Sang-Gyeun Ahn, Seattle, WA (US); Tianyi Li, Seattle, WA (US); Zhongjie Qian, Seattle, WA (US); Vigneshwar Sakthivelpathi, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 18/091,219

(22) Filed: Dec. 29, 2022

(65) Prior Publication Data
US 2023/0213360 A1   Jul. 6, 2023

Related U.S. Application Data

(60) Provisional application No. 63/295,227, filed on Dec. 30, 2021.

(51) Int. Cl.
*G01D 5/24* (2006.01)
*G01F 22/02* (2006.01)
*G06F 3/01* (2006.01)

(52) U.S. Cl.
CPC .............. *G01D 5/24* (2013.01); *G01F 22/02* (2013.01); *G06F 3/011* (2013.01)

(58) Field of Classification Search
CPC ........ G01R 27/00; G01R 27/02; G01R 27/26; G01R 27/2605; G01D 5/00; G01D 5/12; G01D 5/14; G01D 5/24; G06F 3/00; G06F 3/01; G06F 3/011; G01F 22/00; G01F 22/02
USPC ........................................ 324/600, 649, 658
See application file for complete search history.

(56) References Cited

U.S. PATENT DOCUMENTS

| | | | |
|---|---|---|---|
| 5,512,836 A | 4/1996 | Chen et al. | |
| 6,946,851 B2 * | 9/2005 | Lee | G01R 15/16 977/953 |
| 9,103,775 B2 | 8/2015 | Bradley et al. | |
| 2008/0170982 A1 | 7/2008 | Zhang et al. | |
| 2012/0170241 A1 | 7/2012 | Nakako et al. | |

(Continued)

FOREIGN PATENT DOCUMENTS

| | | | |
|---|---|---|---|
| JP | 6190636 B2 | 8/2017 | |
| WO | 2021081425 A1 | 4/2021 | |
| WO | WO-2022140286 A1 * | 6/2022 | ............ D06M 11/74 |

OTHER PUBLICATIONS

Li, Y.K. et al., "Laser-Patterned Copper Electrodes for Proximity and Tactile Sensors," Advanced Materials Interfaces, vol. 7, No. 4, Feb. 2020, 9 pages.

(Continued)

*Primary Examiner* — Hoai-An D. Nguyen
(74) *Attorney, Agent, or Firm* — CHRISTENSEN O'CONNOR JOHNSON KINDNESS PLLC

(57) ABSTRACT

A capacitive sensor including an electrically conductive material, and a single electrode applied with positive potential, wherein the distance between the single electrode and the electrically conductive material determines the spherical radius for a proximity sensing range.

20 Claims, 30 Drawing Sheets

(56) References Cited

U.S. PATENT DOCUMENTS

2019/0265236 A1 8/2019 Khalid
2020/0370972 A1* 11/2020 Chung .................... G01L 1/142

OTHER PUBLICATIONS

Murai, A. et al., "Datsuryoku Sensor—A Capacitive-Sensor-Based Belt for Predicting Muscle Tension: Preliminary Results," Sensors, vol. 21, No. 19, Oct. 2021, 15 pages.

Qin, H.T. et al., "Direct Printing of Capacitive Touch Sensors on Flexible Substrates by Additive E-Jet Printing With Silver Nanoinks," Journal of Manufacturing Science and Engineering—Transactions of the Asme, vol. 139, No. 3, Mar. 2017, 7 pages.

Frutiger, A. et al., "Capacitive Soft Strain Sensors via Multicore-Shell Fiber Printing," Advanced Materials, vol. 27, No. 15, pp. 2440-2446, Apr. 2015.

Zhang, J.Y. et al., "Electromechanical coupling of isotropic fibrous networks with tailored auxetic behavior induced by water-printing under tension," Journal of Materials Chemistry C, vol. 9, No. 13, pp. 4544-4553, Apr. 2021.

Yang, X. et al., "A flexible capacitive sensor based on electrospun PVDF nanofiber membrane with carbon nanotubes," Sensors and Actuators A: Physical, vol. 299, Nov. 1, 2019, 9 pages.

Wang, X. et al., "Flexible poly(styrene-butadiene-styrene)/carbon nanotube fiber based vapor sensors with high sensitivity, wide detection range, and fast response," Sensors Actuators, B Chem, vol. 256, pp. 896-904, 2018.

Zhu, P. et al., "Flexible and Highly Sensitive Humidity Sensor Based on Cellulose Nanofibers and Carbon Nanotube Composite Film," vol. 35 No. 14, pp. 4834-4842, Mar. 20, 2019.

Ion, F., "From touch displays to the Surface: A brief history of touchscreen technology", arsTechnica, Apr. 4, 2013.

Rivadeneyra, A. et al., "Recent Advances in Printed Capacitive Sensors", Micromachines 2020, vol. 11, No. 4, Apr. 1, 2020, 20 pages.

Chen, Y. et al., "Flexible capacitive pressure sensor based on multi-walled carbon nanotubes microstructure electrodes", Journal of Physics D: Applied Physics, vol. 54, No. 15, Jan. 28, 2021, 12 pages.

Torres, JC., "Steam VR 'Knuckles' controller has a lot of capacitive sensors", Slash Gear, Jun. 23, 2017.

"Capacitive Sensor Market is Growing at a 5.2% CAGR During 2020-2027—Report by Market Research Future (MRFR)", Market Research Future, Aug. 2, 2021, retrieved on Feb. 1, 2023, https://www.globenewswire.com/news-release/2021/08/02/2273118/0/en/Capacitive-Sensor-Market-is-Growing-at-a-5-2-CAGR-During-2020-2027-Report-by-Market-Research-Future-MRFR.html.

International Search Report and Written Opinion mailed Mar. 30, 2023, issued in corresponding International Application No. PCT/US2022/082586, filed Dec. 29, 2022, 11 pages.

* cited by examiner

Paired fibrous sensor (PF)

Paired hybrid sensor (PH)

Paired rectangular sensor (PR)

Single fibrous sensor (SF)

Single rectangular sensor (SR)

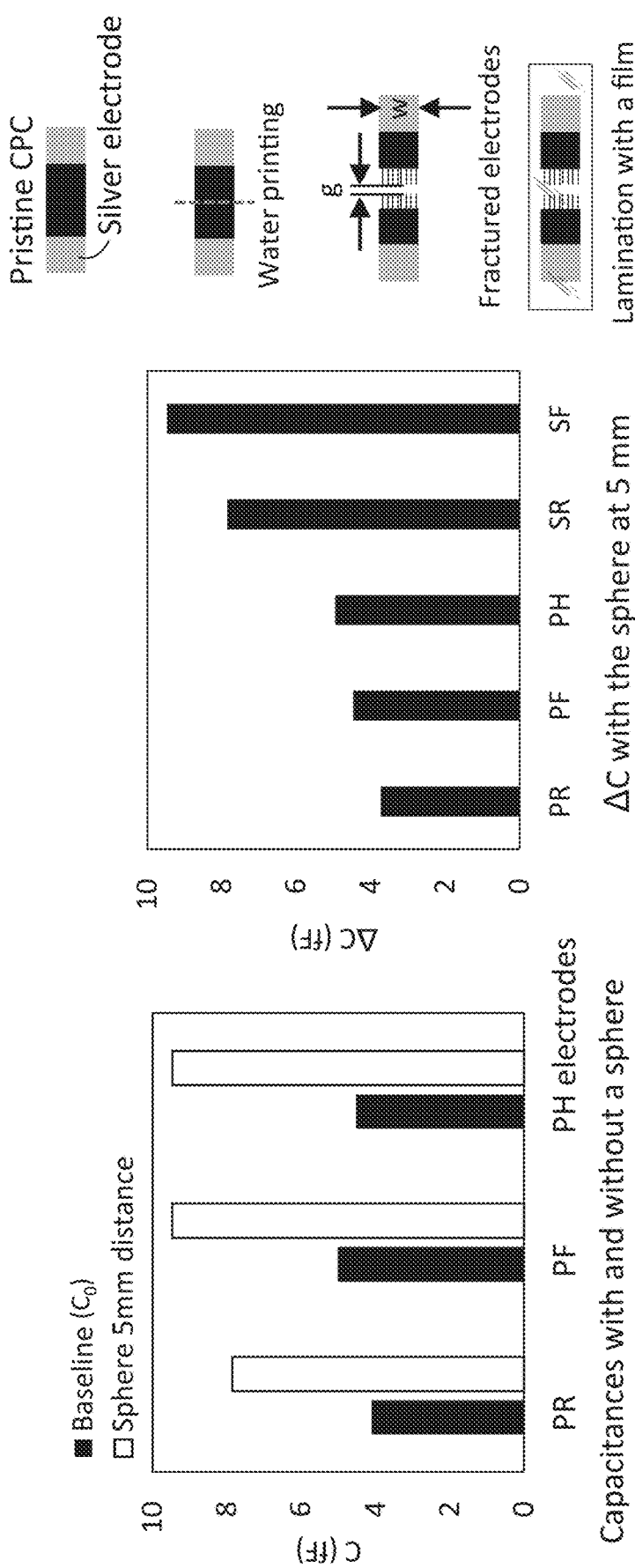

ULTRASENSITIVE CAPACITIVE SENSOR COMPOSED OF NANOSTRUCTURED ELECTRODES

CROSS-REFERENCE TO RELATED APPLICATION

The present application claims priority to and the benefit of U.S. Provisional Application No. 63/295,227, filed Dec. 30, 2021, the entire disclosure of which is hereby incorporated by reference herein in their entirety for all purposes.

STATEMENT OF GOVERNMENT LICENSE RIGHTS

This invention was made with United States Government support under Grant No. 1927623 awarded by National Science Foundation. The Government has certain rights in the invention.

BACKGROUND

In the implementation of the human-machine interface (HMI), sensors play a crucial role in detecting human behavior and cognitive action. Sensors collect foundational information to enable efficient communication, process control, and safety assurance. An intelligent system can use sensors to recognize human instructions, which can be conveyed through voice, gesture, and body movements. Various sensing mechanisms have been deployed for HMI. For example, inertia, force, and impedance sensors are popular in industrial and health monitoring. Electromagnetics, infrared, and capacitive sensors are also contenders in such fields.

To date, capacitive sensors have made significant progress in touch screen interface, accurate proximity detection, and other physical and chemical sensing applications. Recent progress has been made on flexible-substrate based micropatterned or nanostructured capacitive sensors. A copper plate was micro-patterned to form an array of crossbar junctions. Conductive fibers, printed conductive ink, and ionized liquid have been used for flexible sensors. The sensitivity of a capacitive sensor is determined by electrode geometry and environmental factors. A small form factor of a capacitive sensor is preferred in most HMI applications. With the smaller size, the sensitivity reduces, which is one of the main challenges. Accordingly, smaller capacitive sensors with increased sensitivity are needed.

Described herein is a capacitive sensor composed of a nanostructured electrode array. One capacitive electrode is composed of high aspect-ratio cellulose fibers embedded with multiwalled carbon nanotubes. The electrode array enlarges the capacitance with a reduced form factor. The capacitive sensing mechanism is analyzed by numerical analysis. The sensitivity of multiple capacitance configurations is characterized for human hand detection. The highest sensitivity format is further characterized for detecting finger force and water volume. The real-time response of the fabricated sensors is demonstrated by a smart pad to facilitate the next generation HMI.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1D is a graph showing capacitances of various sensors, in accordance with the present technology;

FIG. 1E is a graph showing the change in capacitance of the various sensors of FIG. 1D, in accordance with the present technology;

FIG. 1F is a schematic illustration of an example fibrous electrode fabrication process; in accordance with the present technology;

SUMMARY

Figure 1A:
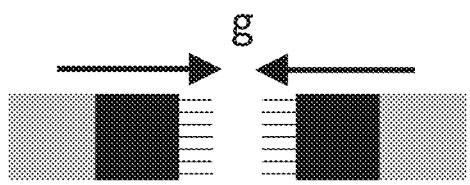
FIG. 1A is an illustration of example electrode configurations of an example sensor; in accordance with the present technology.
Figure 1A:
Figure 1A:
Figure 1A:
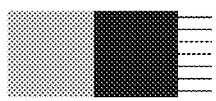
Figure 1A:

Human-machine interface (HMI) requires various sensors for communication, manufacturing and environmental control, and health and safety monitoring needs. Capacitive sensors have been used to detect touch, distance, geometry, electric property, and environmental parameters. However, highly sensitive proximity detection with a small form factor has always been a challenge. Described herein is a capacitive sensor composed of a nanostructured electrode array for contact and noncontact detection. In the sensor configuration, the nanostructured electrode is made of high aspect ratio cellulose fibers embedded with carbon nanotubes. The complementary electrode is designed to be smaller in surface area for a high sensitivity. In some embodiments, no complementary electrode is needed. In some embodiments, a single, positively charged electrode made of high aspect ratio cellulose fibers embedded with carbon nanotubes is disclosed. In some embodiments, the single, positively charged electrode is a rectangular electrode as described herein. In some embodiments, a positively charged electrode made of high aspect ratio cellulose fibers is paired with a positively charged rectangular electrode. The unique sensing mechanism is shown to enhance the proximity sensitivity for target detection. A pair of the asymmetrically designed electrode is characterized and compared with the traditional symmetric setup for proximity and contact detection of human hands. The sensor performance in the water detection in glass- and metal cups is also tested. Also described is a smart pad that can recognize human gestures, gait, and water supply with unprecedented sensitivity.

In one aspect, a capacitive sensor comprising an electrically conductive material, and a single electrode applied with positive potential, wherein the distance between the single electrode and the electrically conductive material determines the spherical radius for a proximity sensing range is disclosed.

In another aspect, a capacitive sensor comprising an electrically conductive material coupled to a first electrode applied with positive potential and a composite substrate comprising a template material, wherein the template material comprises a plurality of insulating fibers, and a plurality of carbon nanotubes bonded to the insulating fibers forming a nanotube coating on the insulating fibers, wherein one edge of the composite substrate is torn, induced by a unidirectional tensile force to the composite substrate, wherein the plurality of insulating fibers align along the tensile force and expand in an out-of-plane direction at the site of the tear; and wherein a second electrode is coupled to the nanotube coating at the site of the tear, such that an electrical signal passes through the plurality of junctions at the site of the tear from the second electrode to the first electrode is disclosed.

In another aspect, a sensing pad comprising four sensors, wherein each of the four sensors is a sensor as described herein, and wherein the four sensors are arranged in a 2×2 sensor array a capacitance-to-digital chip communicatively coupled to the four sensors and located in the center of the array, and four lobes extending from the capacitance-to-digital chip, wherein each lobe physically connects one of the four sensors to the capacitance-to-digital chip in the shape of an X is disclosed.

In yet another aspect, a method of making a sensor, the method comprising applying an unidirectional tensile force to a composite substrate wherein a plurality of insulating fibers aligns along the tensile force and bulging with out-of-plane direction at the site of a tensional tear, wherein the precursor composite substrate comprises a composite substrate comprising a template material wherein the template material comprises a plurality of insulating fibers, and a plurality of carbon nanotubes bonded to the insulating fibers forming a nanotube coating on the insulating fibers, and an electrode coupled to the nanotube coating on the site of the tear, such that an electrical signal passes through the plurality of junctions at the site of the tear is disclosed.

In another aspect, a sensor manufactured by any one of the methods described herein is disclosed.

DETAILED DESCRIPTION

Numerical analysis was performed to aid the understanding of the sensing mechanism for nanostructured electrode capacitance. Typically, a capacitance parameter is the normalized capacitance change, $[(C_1-C_0)/C_0]$, where $C_1$ and $C_0$ are the capacitance values with and without an object. A capacitance parameter is defined herein as $\Delta C$, which is $(C_1-C_0)$, instead of $\Delta C/C$. The rationale to use $\Delta C$ is that a nanostructured electrode array has a capacitance below 1 pF due to a small form factor. Considering the noise in the measurement, we speculate that the smaller denominator in the parameter of $\Delta C/C_0$ can cause a larger error. Besides, with the advent of high-resolution capacitance chips, the capacitance below $10^{-15}$ F (i.e., 1 fF) can be measured with digitized values. Using $\Delta C$ as a parameter, capacitance signals can be correlated with the behavior of a target.

The electrode design was analyzed based on a three-dimensional numerical analysis (FIG. 6) to maximize $\Delta C$. Using fibrous and rectangular electrodes, five combinations of capacitive sensors could be constructed, namely—paired fibrous (PF), paired hybrid (PH), paired rectangular (PR), single fibrous (SF), and single rectangular (SR) electrodes (FIG. 1A). In the three-dimensional numerical analysis, only PF, PH, and PR electrodes were modeled because the $C_0$ value approached 0 fF for SF and SR electrodes. With the presence of an object, the C1 value was the same as either PH or PR, depending on the electrode used. The gap size (g) between electrodes was 1 mm unless otherwise specified. A potential of 5 V at 100 kHz was applied between the two electrodes. An electrically grounded spherical object with 80-dielectric constant and 5 mm-diameter was suspended at 5 mm above the gap center.

FIG. 1A is an illustration of example electrode configurations of an example sensor, in accordance with the present technology. In one embodiment, the capacitive sensor is a single, rectangular electrode (SR) applied with positive potential. In another embodiment, the capacitive sensor is a single fibrous electrode (SF), such that the capacitive sensor is made of a template material made of a plurality of insulating fibers and a plurality of carbon nanotubes bonded to the insulating fibers forming a nanotube coating on the insulating fibers, and where one edge of the composite substrate is torn, induced by a unidirectional tensile force to the composite substrate, wherein the plurality of insulating fibers align along the tensile force and expand in an out-of-plane direction at the site of the tear; and wherein the single electrode is coupled to the nanotube coating at the site of the tear, such that an electrical signal passes through the plurality of junctions at the site of the tear. In yet another embodiment, the capacitive sensor has two positive potential electrodes, one a rectangular electrode, and the other a fibrous electrode (PH), so that the electrical signal passes through the plurality of junctions at the site of the tear of the fibrous electrode to the rectangular electrode. In some embodiments, the capacitive sensor further includes an electrically grounded electrode that is at least 3 mm from the electrode(s), and in some embodiments, the electrically grounded electrode has a surface area that is smaller than the surface area of the electrode(s).

Figure 1C:
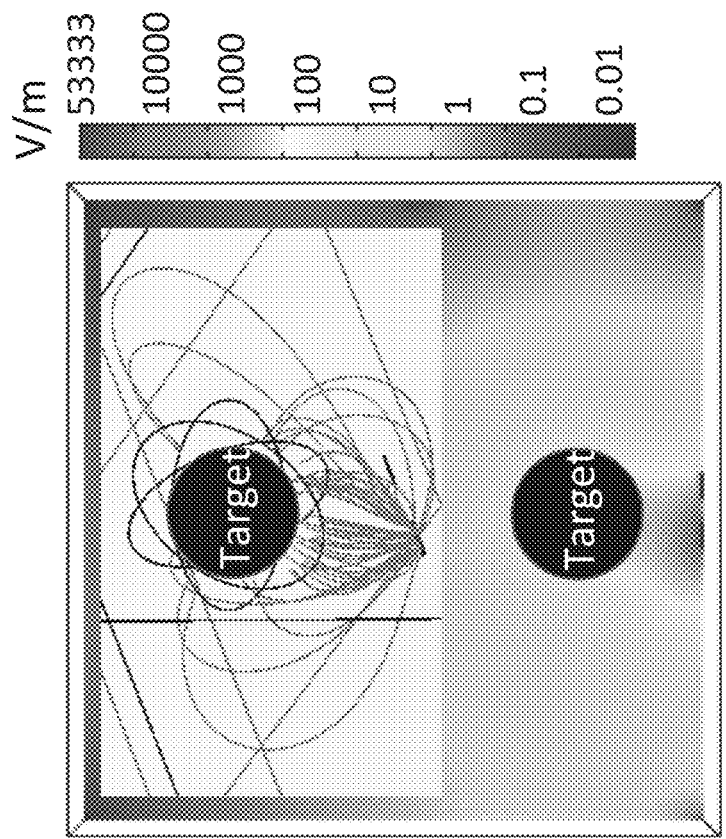
FIGS. 1B-1C are graphs showing an electric field distribution of an example sensor without and with a target spherical object, in accordance with the present technology.
Figure 1B:
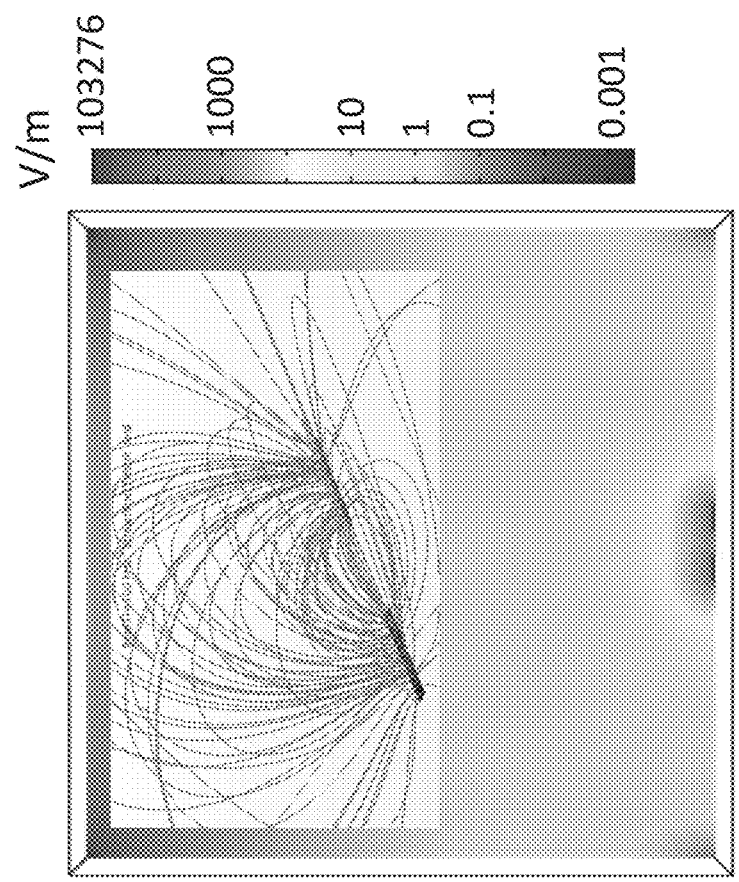

FIGS. 1B-1C are graphs showing an electric field distribution of an example sensor without and with a target spherical object, in accordance with the present technology. On the left side of both FIG. 1B and FIG. 1C is the V/m of the electric field. The electric field distributions of the different paired electrode configurations were modeled both in the absence (FIG. 1B) and presence (FIG. 1C) of the sphere. The inset images show the corresponding electric field. The left and right electrodes in the PH configuration were made of fibrous and rectangular-shaped electrodes, respectively. When the fibrous electrode was replaced by a second rectangular-shaped electrode in the paired system, the value of $C_0$ decreased slightly. On the contrary, when the rectangular-shaped electrode of the PH configuration was replaced by another fibrous electrode, $C_0$ increased. Due to the larger surface area of fibrous electrodes, $C_0$ increased in the sequence of PR, PH, and PF electrodes. With the introduction of the grounded sphere into the electric field generated by paired electrodes (FIG. 1C), the majority of charge interactions (88~98%) were governed by the capacitance between the fibrous electrode and the grounded sphere (inset FIG. 1C and FIG. 7). This was demonstrated by the fact that the fibrous electrodes (i.e., PH and PF) exhibited the largest $C_1$ values, when the target sphere was present. Therefore, the contribution of the rectangular-shaped electrode to $C_1$ could be neglected.

FIG. 1D is a graph showing capacitances of various sensors, in accordance with the present technology. On the vertical axis is the capacitance in fF. On the horizontal axis is the capacitance of PR, PF, and PH electrodes with and without the sphere as shown in FIGS. 1B-1C. As shown in FIG. 1D $C_0$ and $C_1$ for PR, PF, and PH electrodes. As a result, the PH configuration showed the largest $\Delta C$ among all paired electrodes. Since $C_1$ did not increase with the addition of a second fibrous electrode (i.e., PF configuration), one way to improve $\Delta C$ was to reduce further $C_0$ by eliminating the rectangular-shaped electrode. As far as $C_0$ could be stable, single electrode configurations showed higher $\Delta C$.

FIG. 1E is a graph showing the change in capacitance of the various sensors of FIG. 1D, in accordance with the present technology. On the horizontal axis is the change in capacitance with the sphere at 5 mm. On the vertical axis is the change in capacitance in fF. Due to the larger surface area, the SF electrode showed the largest $\Delta C$. The sensitivity depending on the sensor configurations has been explored experimentally in the next sections.

FIG. 1F is a schematic illustration of an example fibrous electrode fabrication process; in accordance with the present technology. Fibrous electrodes were fabricated by controlled water-printing and stretching. The fabricated widths of fibrous electrodes were 1, 3, 5, and 10 mm. According to optical and scanning electron microscope study, the linear density, average length, and average thickness of fibers were $14.5\pm3.6$ mm$^{-1}$, $1.71\pm0.4$ mm, $5.9\pm1.6$ µm, respectively (see FIGS. 8A-8H). The aspect ratio determining the electric field strength ranged from 200 to 490. In some embodiments, the electrically conductive fibers have an aspect ratio greater than 10, wherein the aspect ratio is either the length/diameter, the length/thickness, or the length/width.

Figure 1G:
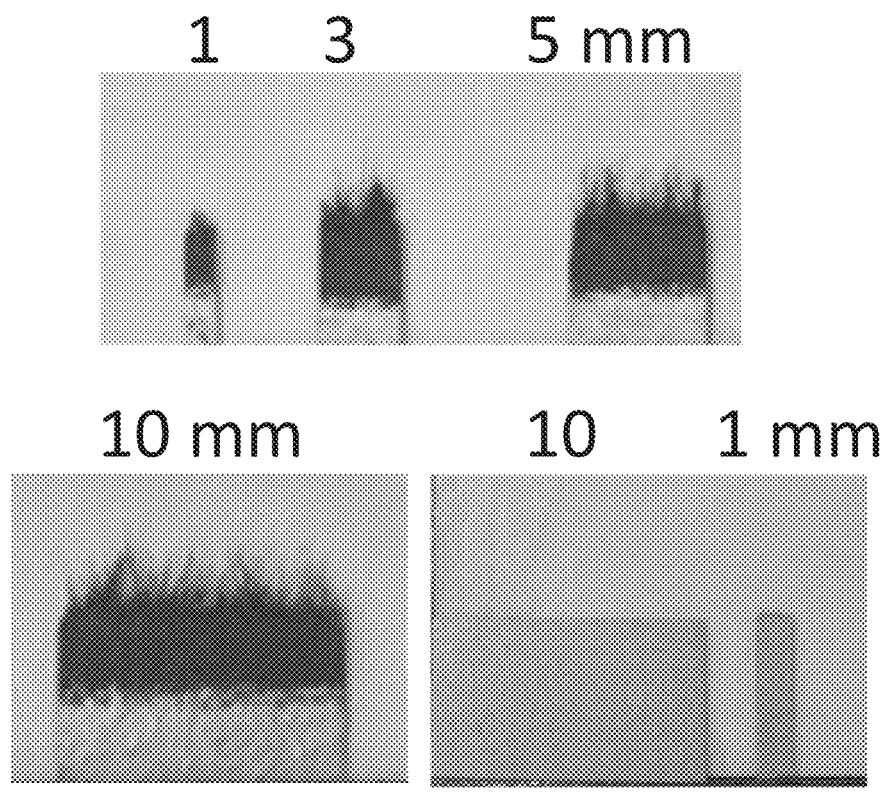
FIG. 1G is representative photographs of as-prepared fibrous and silver electrodes with various widths, in accordance with the present technology.

FIG. 1G is representative photographs of as-prepared fibrous and silver electrodes with various widths, in accordance with the present technology. The rectangular electrode was fabricated by coating silver ink onto a 100 µm-thick polyethylene terephthalate (PET) film. The rectangular electrodes were fabricated to the widths of 1 and 10 mm.

Figure 1H:
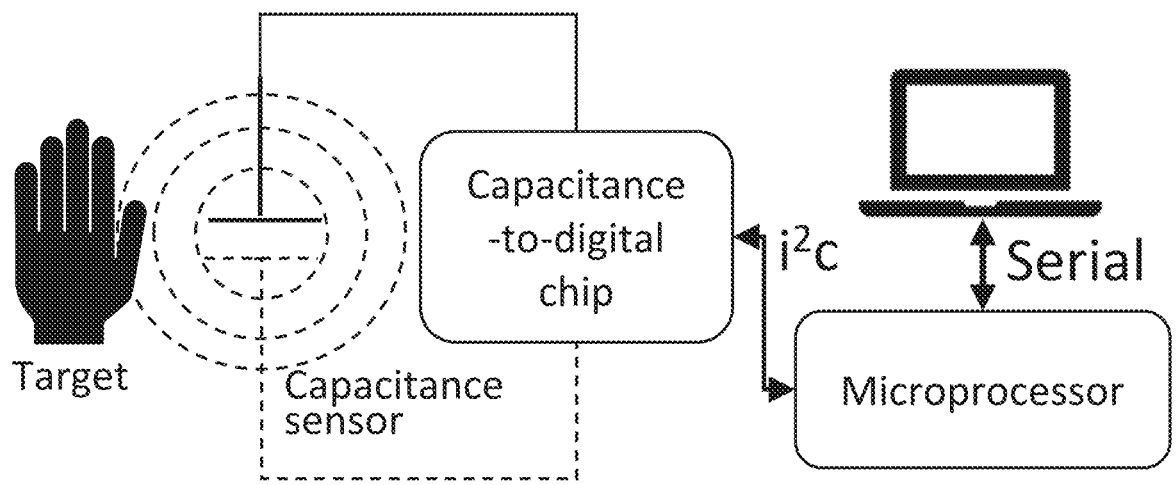
FIG. 1H is an example electric circuit composed of a capacitance-to-digital chip and computer interface, in accordance with the present technology.

FIG. 1H is an example electric circuit composed of a capacitance-to-digital chip and computer interface, in accordance with the present technology. A capacitance-to-digital chip (FDC 1004, Texas Instruments) alongside a microprocessor (ATmega328PU) (FIG. 1h) was used for measuring the capacitance of sensors. In some embodiments, the composite substrate is between 1-10 mm wide. In some embodiments, the plurality of carbon nanotubes is 1-20 wt % of the composite substrate. In some embodiments, the plurality of insulating fibers is at least six insulating fibers per millimeter of the composite substrate.

Figure 2A:
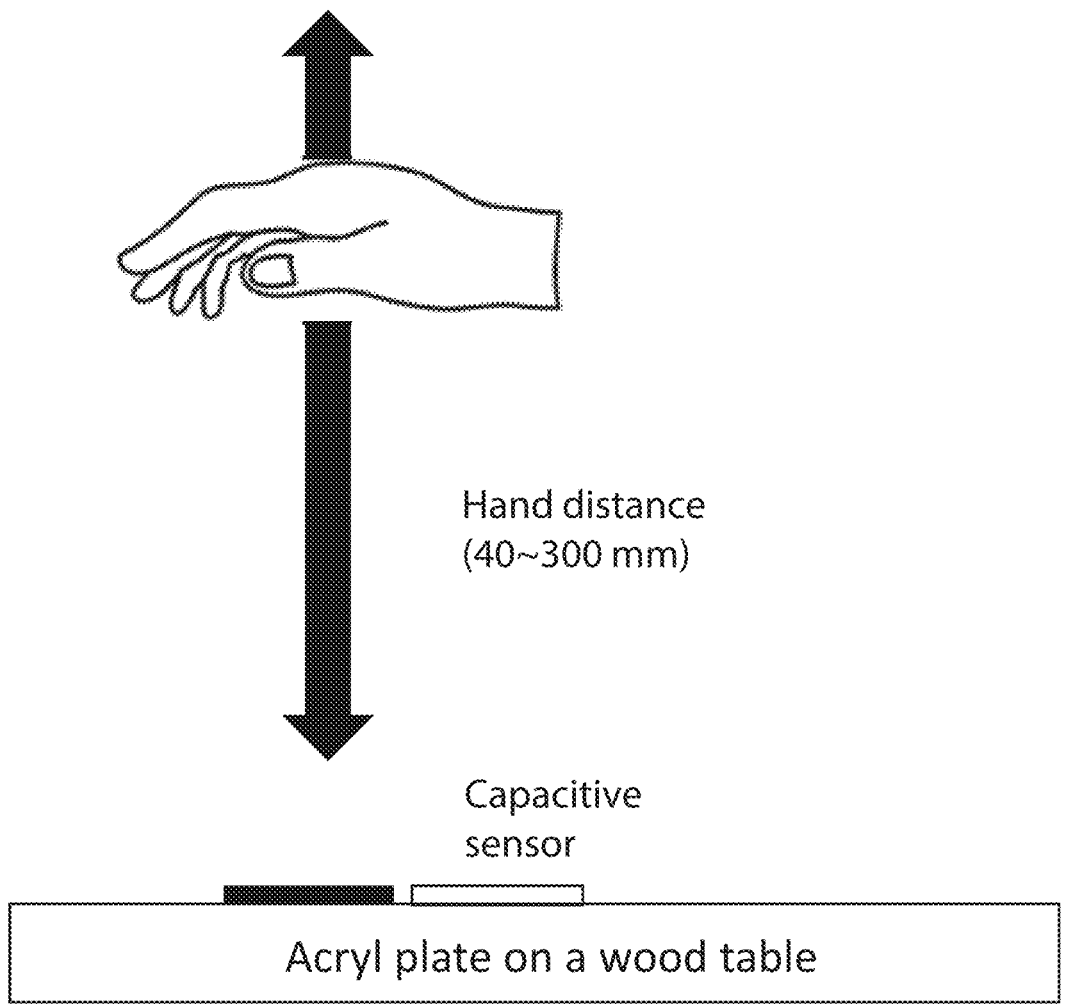
FIG. 2A is an example set up of a hand proximity detection test, in accordance with the present technology.

FIG. 2A is an example set up of a hand proximity detection test, in accordance with the present technology. The setup was developed to sense a hand at the distance of 40~300 mm using PR, PF, and PH sensors. In the proximity testing, the sensors were attached to the same 1 mm-wide silver-coated PET electrode. By using the same electrode, the change of the parasitic capacitance was minimized in a sensitivity test. The hand's proximity sensing was conducted from a 300 mm distance but capped at 40 mm, owing to the expected working distance and inaccuracies in hand distance control.

Figures 2B, 2C:
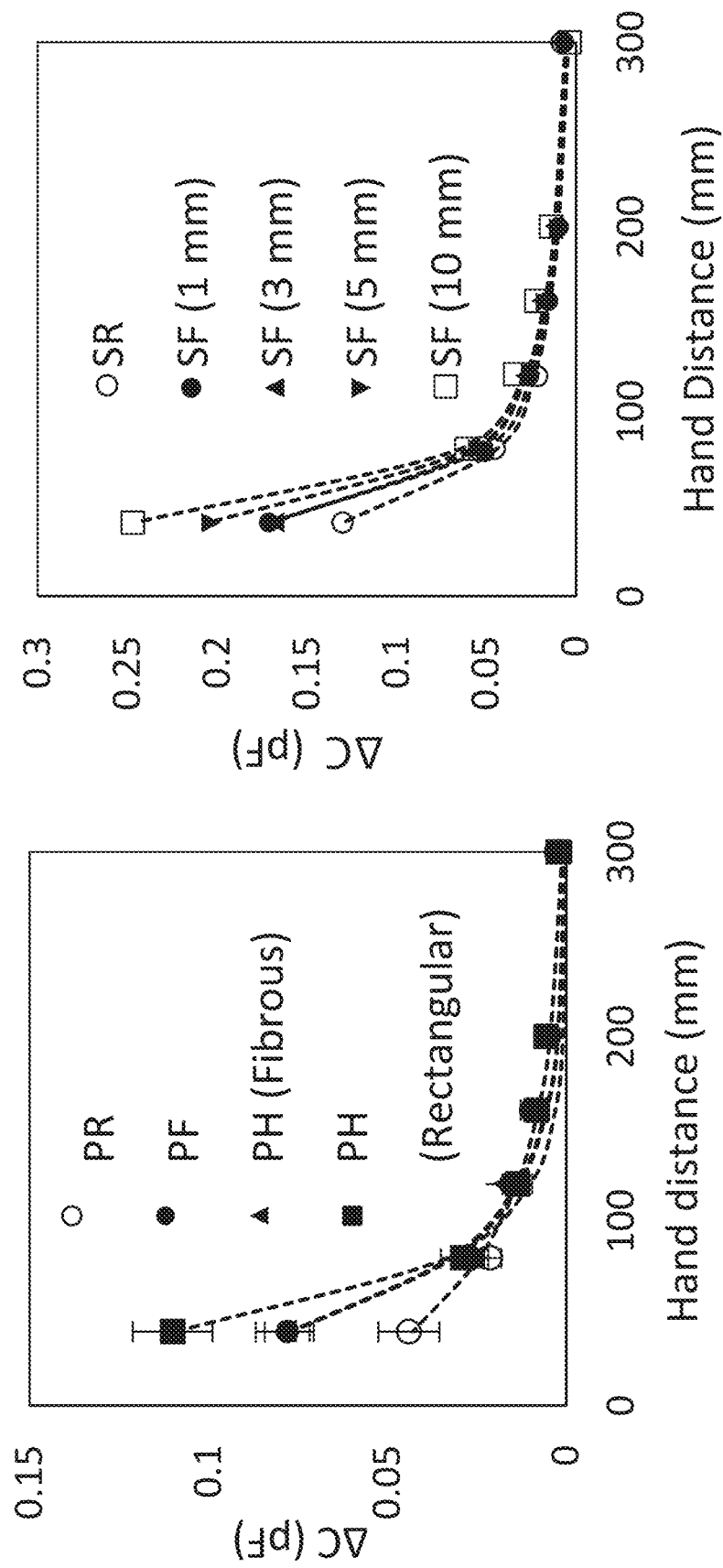
FIGS. 2B-2C are graphs of change of capacitance measurements of paired electrodes and single electrodes, respectively, in accordance with the present technology.

FIGS. 2B-2C are graphs of change of capacitance measurements of paired electrodes and single electrodes, respectively, in accordance with the present technology. On the horizontal axis is the hand distance in mm. On the vertical axis is the change in capacitance in pF. For PR, PF, and PH sensors, the ΔC average values were compared for hand proximity. (FIG. 2B). As predicted by the above numerical analysis, the ΔC of the hybrid configuration (i.e., PH) was the highest among the paired sensors. The maximum ΔC of 109±11.1 fF at a hand-sensor distance of 40 mm was nearly three times that of the PR sensor (i.e., 42.8±8.5 fF). The PF sensor showed higher sensitivity than that of a PR sensor due to the larger surface area of fibrous electrodes. Furthermore, the sensitivity of a PH sensor was dependent on the polarity of the applied potential. When a positive potential was applied to the rectangular-shaped electrode of a PH sensor (FIG. 2B), ΔC was higher. Considering a background noise level of 4 fF (peak-to-peak value; $C_{pp}$), the largest detectable distance of a human hand was 150 mm for a PH sensor. As predicted from the numerical analysis, the single-electrode configurations (i.e., SR and SF sensors) exhibited significant sensitivity enhancement (FIG. 2C). In both cases, the positive potential was applied to the single electrode while the ground potential was not used. Switching from SR to SF, the ΔC increased from 42.8 to 130 fF. Moreover, we used a 1 mm-wide SF sensor to reach a ΔC of 169 fF, which superseded the 109 fF of a PH sensor. Increasing the width of an SF improved sensitivity. As the width of an SF sensor increased from 1 to 10 mm, ΔC increased to reach a maximum value of 247 fF. As a result, the detection range was doubled compared to the PH sensors (i.e., 300 mm for 10-mm wide SF against 150 mm for PH). Since the 10-mm wide SF sensors have shown the best sensitivity across the different sensing configurations, further tests were conducted with single electrode sensors.

Figure 2D:
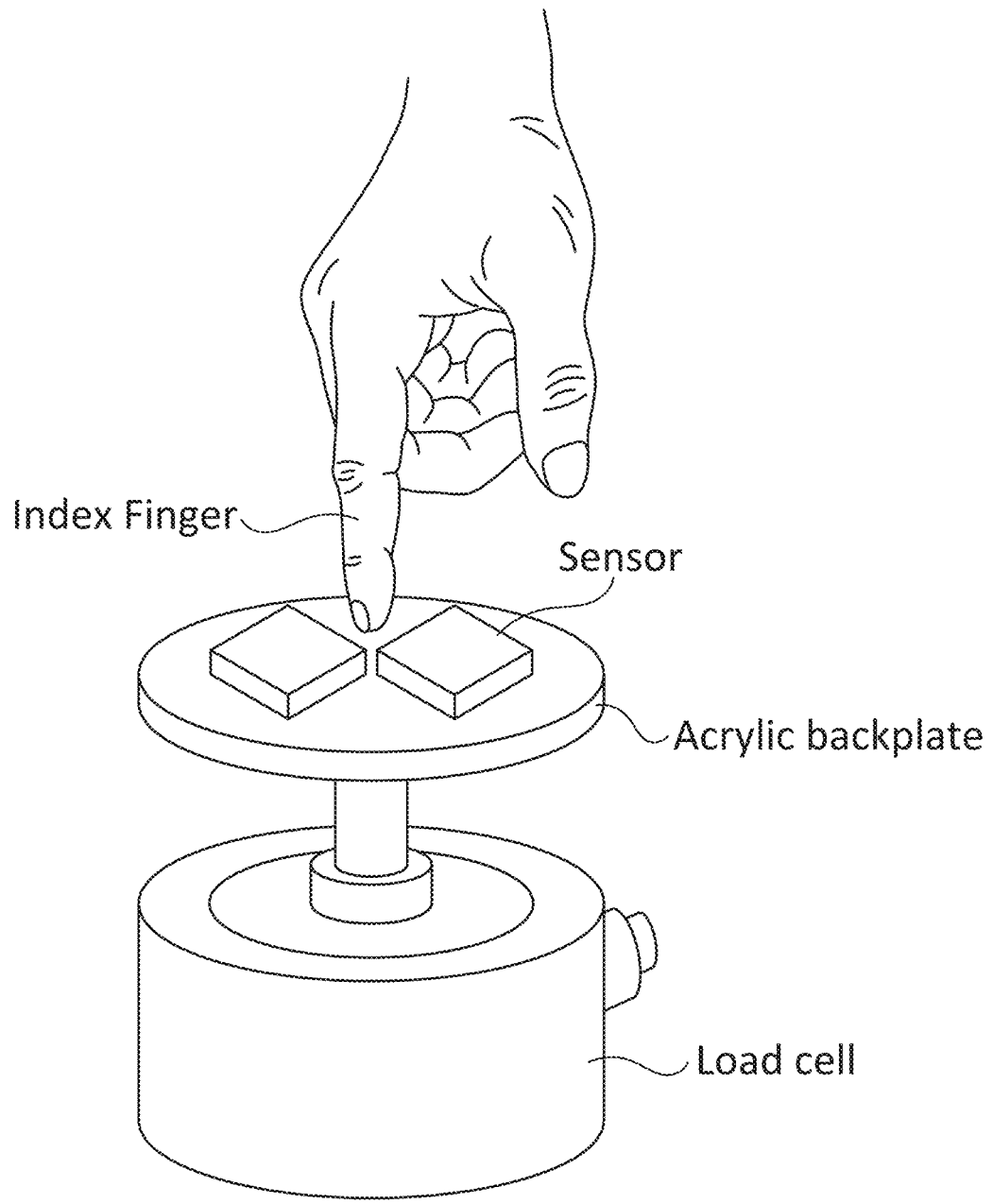
FIG. 2D is an example setup for a finger force detection between 0 and 2 N, in accordance with the present technology.

FIG. 2D is an example setup for a finger force detection between 0 and 2 N, in accordance with the present technology. For finger force testing, 10 mm-wide SF and SR sensors were placed on an acrylic plate. A load cell was installed under the plate to measure the applied finger force.

Figure 2F:
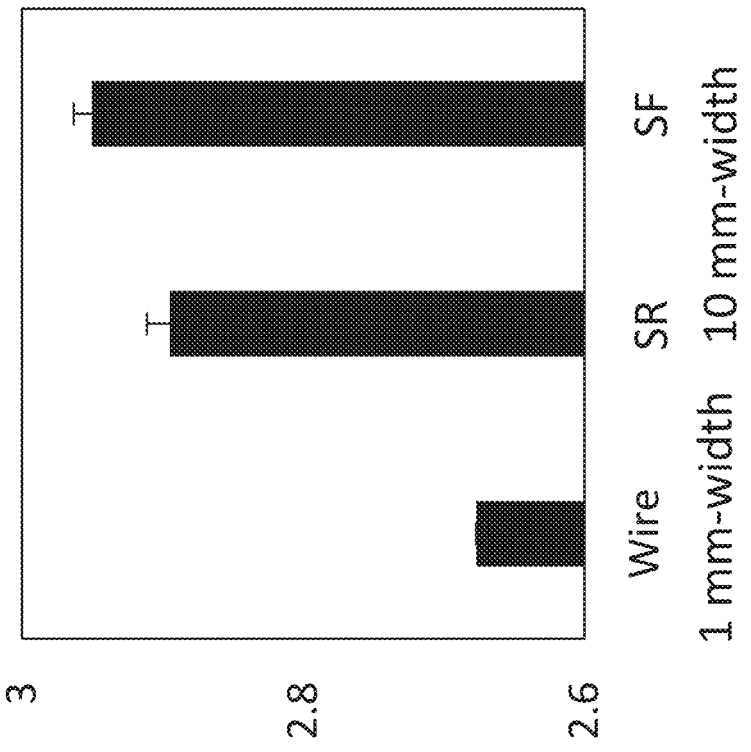
FIG. 2F is a graph of the capacitance of example sensors in the setup of FIG. 2D, in accordance with the present technology.
Figure 2E:
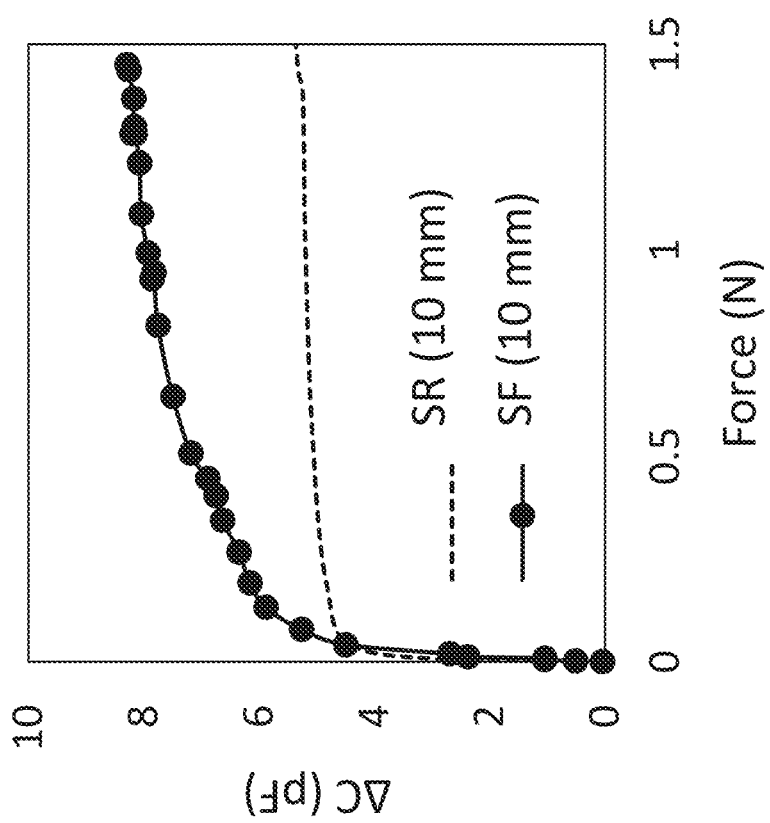
FIG. 2E is a graph of finger force and capacitance relationship for example sensors in the setup of FIG. 2D; in accordance with the present technology.

FIG. 2E is a graph of finger force and capacitance relationship for example sensors in the setup of FIG. 2D, in accordance with the present technology. On the horizontal axis is the force in N. On the horizontal axis is the change in capacitance in pF. The capacitance parameter ΔC was measured from the finger-absence value. When the sensor was pressed with a finger force of 1.5 N, SF sensor's ΔC reached 8.26 pF. In comparison, a 10 mm-wide SR sensor showed only 5.36 pF. Noteworthy, the SF sensor showed a continuous increase of capacitance as the finger force increased. The average conductivity of fibers was 1.8±0.6 S/m in our measurement (as shown in FIGS. 8A-8H). When the fibers were pressurized by a finger, the augmentation in conductance of the fractured fibers could increase the sensor capacitance, which was a unique feature of fibrous sensors.

Figure 9A:
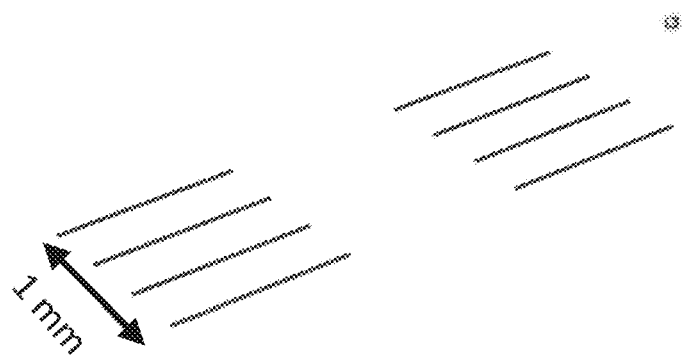
FIGS. 9A-9B are numerical simulation for capacitance depending on the number of fibers, four and six, respectively, in accordance with the present technology.
Figure 9B:
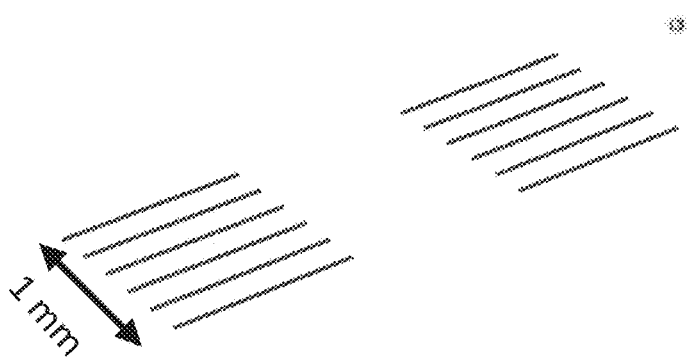
Figure 9C:
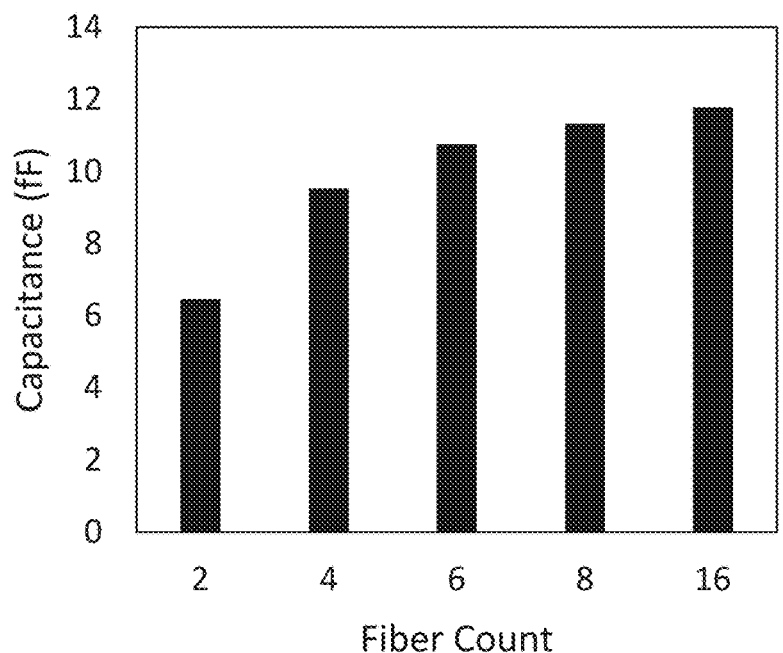
FIG. 9C is a graph showing the $C_0$ of example sensors under different fiber counts, in accordance with the present technology.

FIG. 2F is a graph of the capacitance of example sensors in the setup of FIG. 2D, in accordance with the present technology. On the horizontal axis is the type of sensor (a wire, SR, and SF), and on the vertical axis is capacitance in pF. FIG. 2F shows the capacitance of an SR (1 mm), SR (10 mm), and SF (10 mm). To test the variability in sensor performance, 6 SF and 6 SR sensors were prepared (10 mm-width, N=6). The average capacitances of 10 mm-wide SR and SF sensors were 2.895 and 2.950 pF, respectively. The $C_0$ difference between 10 mm-wide SR and SF sensors was 55 fF due to the larger surface area. The variations in the capacitance value of the different 10 mm-wide SF sensors were less than 0.4%. This was commendable considering the irregular shape of the fractured fibrous network. As the number of conductive fibers increased, the change in the initial capacitance value ($C_0$) became smaller, according to our numerical results (as shown in FIG. 9A-9C). The capacitance value of 10 mm-wide SF sensors approached the average value of 2.950 pF (N=6).

Figure 2G:
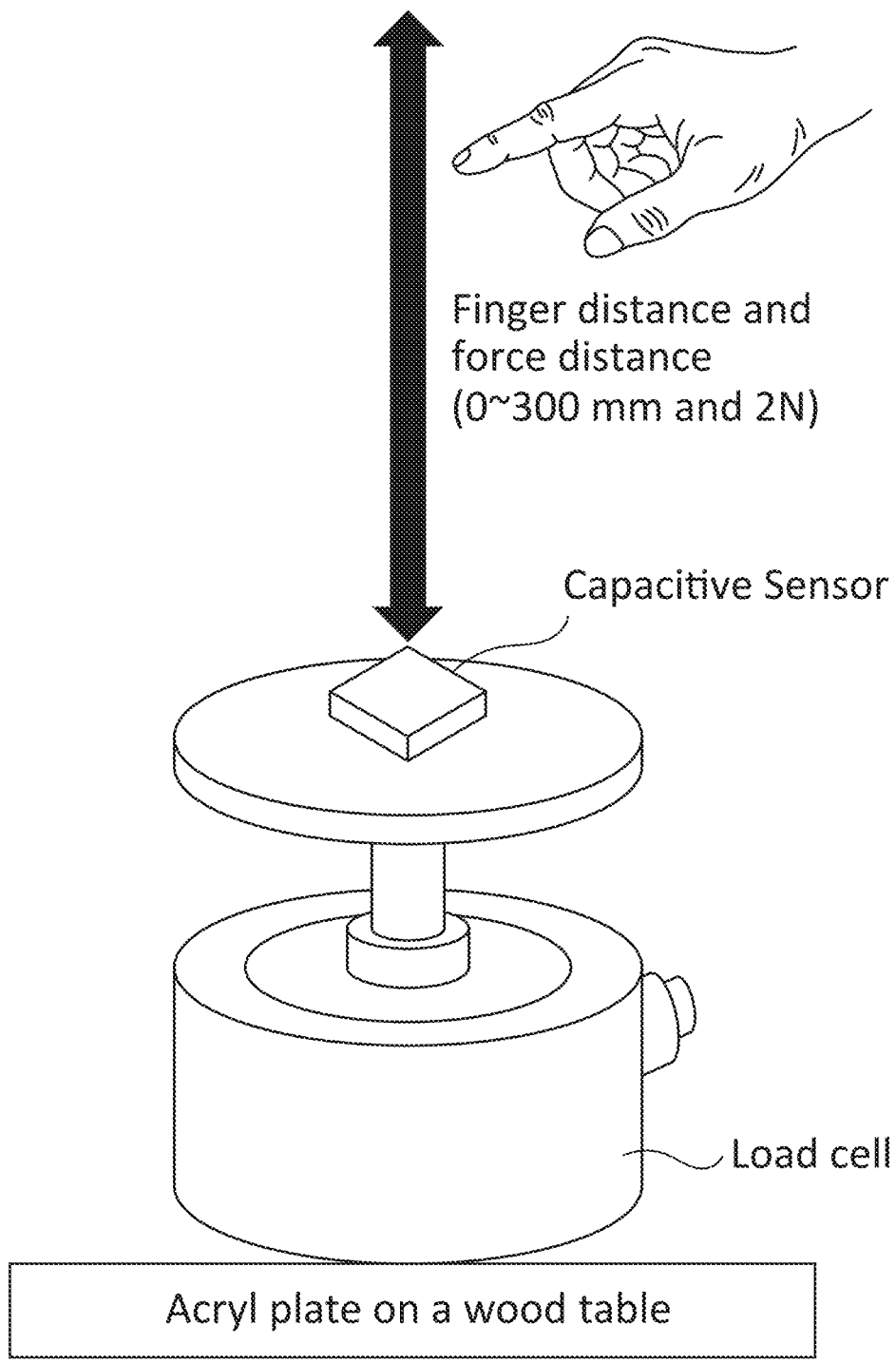
FIG. 2G is an example setup for detection of hand proximity and finger force, in accordance with the present technology.

FIG. 2G is an example setup for detection of hand proximity and finger force, in accordance with the present technology. The setup was designed to measure hand proximity for about 40-300 mm and 0-2N. For the combined testing of proximity, the capacitance change was continuously measured at distances of 300, 200, 100, and 0 mm followed by the finger contact at 2 N-force with a total of 6 replicates.

Figures 2H, 2I:
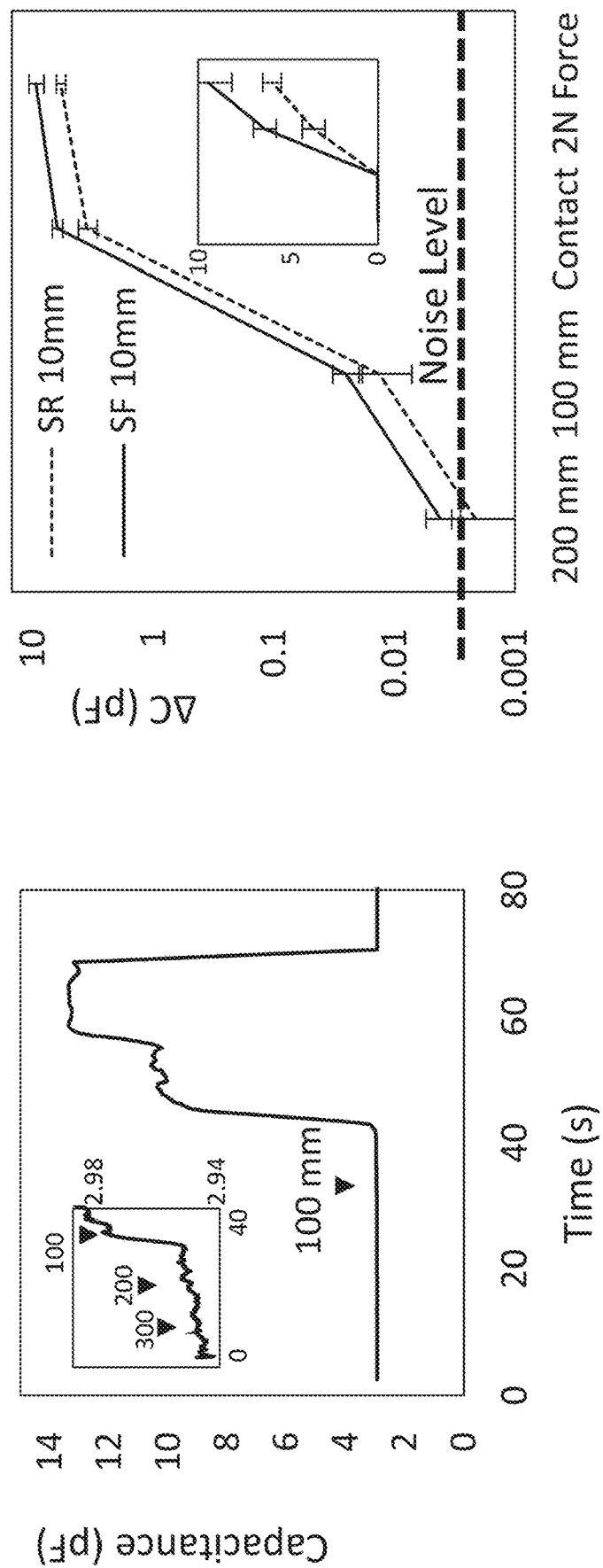
FIG. 2H is a graph of time-dependent $\Delta C$ at the distance of 300~0 mm followed by the finger force of example sensors with the setup of FIG. 2G, in accordance with the present technology.
FIG. 2I is a graph showing the comparison of $\Delta C$ at the distance of 200~0 mm followed by the finger force of example sensors in the setup of FIG. 2G, in accordance with the present technology.

FIG. 2H is a graph of time-dependent ΔC at the distance of 300~0 mm followed by the finger force of example sensors with the setup of FIG. 2G, in accordance with the present technology. On the horizontal axis is time, and on the vertical axis is capacitance in pF. When an index finger moved from 300 to 0 mm and pressed a sensor with a force of 2 N, ΔC increased exponentially. The inset in FIG. 2H shows the exploded view of the capacitance at the 300~100 mm distance range. The largest distance at which a human hand could be detected with this setup was 300 mm.

FIG. 2I is a graph showing the comparison of ΔC at the distance of 200~0 mm followed by the finger force of example sensors in the setup of FIG. 2G, in accordance with the present technology. On the horizontal axis is the distance (200 mm away, 100 mm away, contact, and 2N of force). On the vertical axis is the change in capacitance in pF. The dashed line represents the noise level of the system. The ΔC at 200, 100, 0 mm, and 2 N is shown.

Figure 3A:
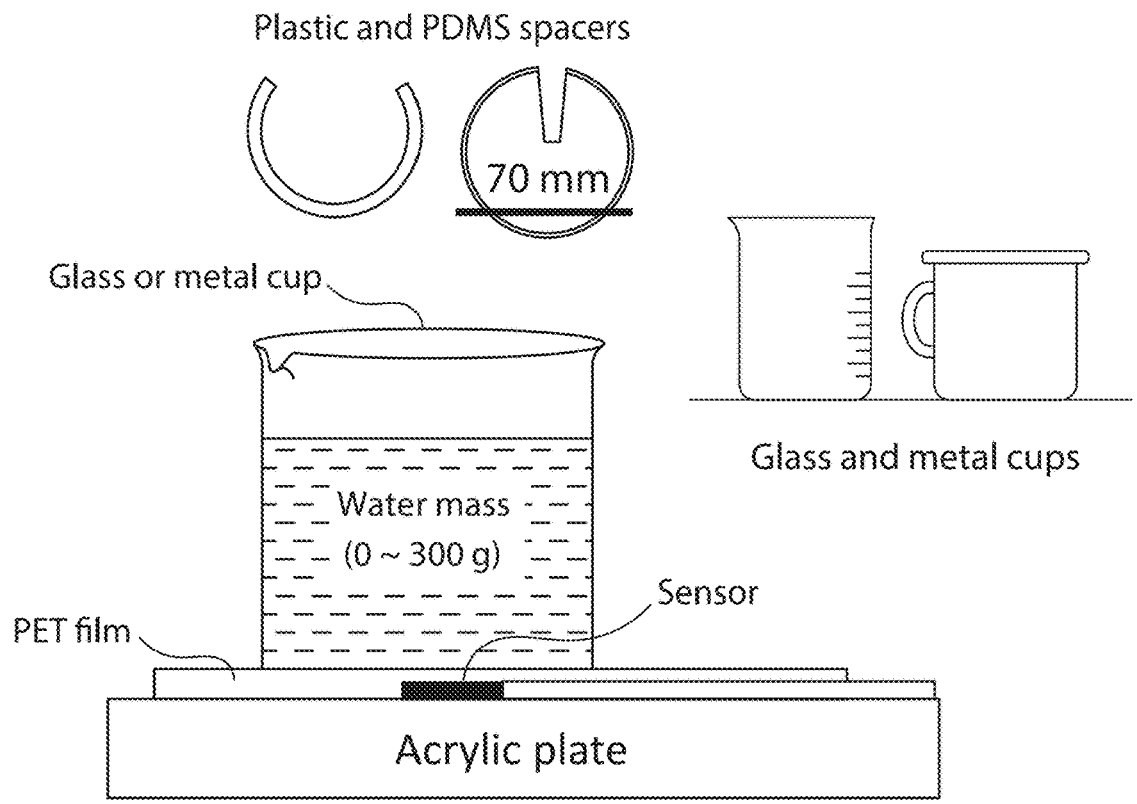
FIG. 3A is an example setup for water volume measurement in glass and metal cups; in accordance with the present technology.

FIG. 3A is an example setup for water volume measurement in glass and metal cups, in accordance with the present technology. The capacitive response of an SF sensor showed the potential to measure an object depending on both weight and charge. SF capacitive sensors with widths of 1, 3, 5, and 10 mm were connected to a 1 mm-wide silver electrode on an acrylic plate. The sensor was covered with a 100 μm-thick PET film.

Figure 3B:
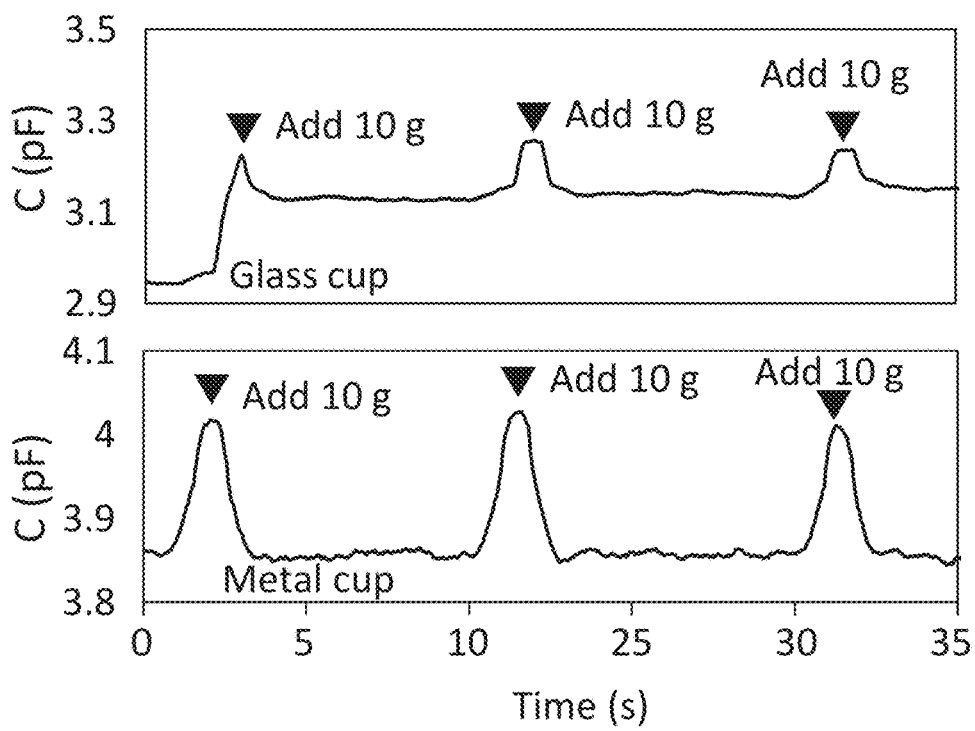
FIG. 3B shows example graphs of time dependent capacitance for the cups of FIG. 3A, in accordance with the present technology.

FIG. 3B shows example graphs of time dependent capacitance for the cups of FIG. 3A, in accordance with the present technology. On the horizontal axis is the time in seconds, and on the vertical axes is capacitance in pF. In some embodiments, the masses of the glass and metal cups are 103 g and 154 g, respectively. Both glass and metal cups were placed on the sensor surface, followed by the addition of water to 30 mL with a 10 mL increment. The top image shows the capacitance change due to the water addition to glass and metal cups using a 1 mm wide-SF sensor. When the first 10 mL was added to a glass cup, ΔC was 140 fF followed by the increase of 10 fF increase with an additional 10 mL. The initial 10 mL showed ΔC much larger than the second and third additions because an electrical double layer formed on a glass surface produced the larger capacitance.

In comparison to a glass cup, a metal cup fully charged with electrons increased $C_0$ by 1.593 pF (bottom image of FIG. 3B). For a 1 mm-wide SF electrode, the addition of the 10 mL water showed ΔC of −3~0 fF. The negative change of ΔC was shown because of the limited capacitance of an SF electrode due to the limited surface area.

Figure 3C:
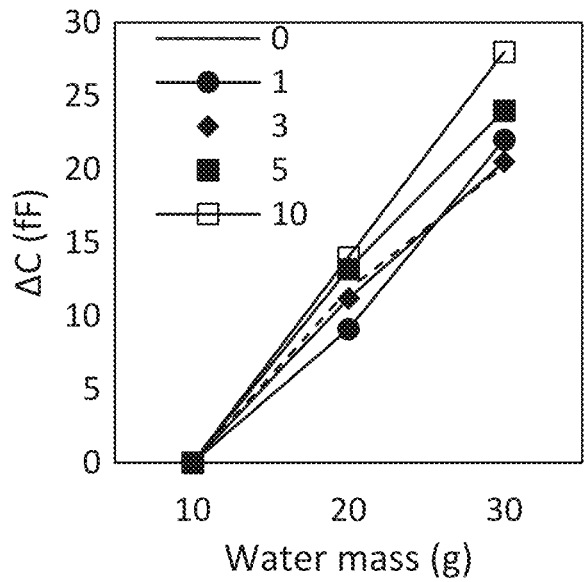
FIGS. 3C-3D are graphs of the change of capacitance in a glass cup and a metal cup of the setup of FIG. 3A, respectively, in accordance with the present technology.
Figure 3D:
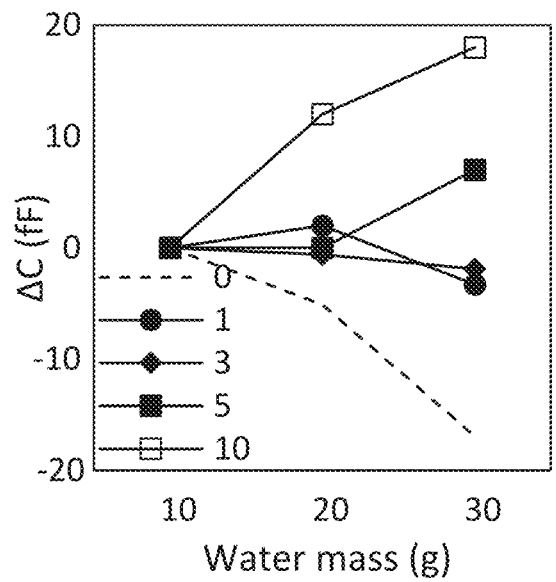

FIGS. 3C-3D are graphs of the change of capacitance in a glass cup and a metal cup of the setup of FIG. 3A, respectively, in accordance with the present technology. On the horizontal axis is the mass of water in grams. On the vertical axis is the change in capacitance in fF. FIG. 3C shows ΔC for 10, 20, and 30 mL water in a glass cup for a 1 mm-wide SR sensor (shown as 0 in FIG. 3C) and 1, 3, 5, 10 mm wide SF sensors. The sensors did not show a high correlation between ΔC and widths due to the dominant charge effect in a glass cup.

FIG. 3D shows ΔC for 10, 20, and 30 mL water in a metal cup for a 1 mm-wide SR sensor (shown as 0 in FIG. 3C) and 1, 3, 5, 10 mm-wide SF sensors. ΔC of a 1-mm wide SR sensor showed a negative value (−18 fF) due to the limited surface area and charge leakage. As the width increased from 1 to 10 mm, ΔC increased to 18 fF for a 10 mm-wide SF sensor.

Figure 3E:
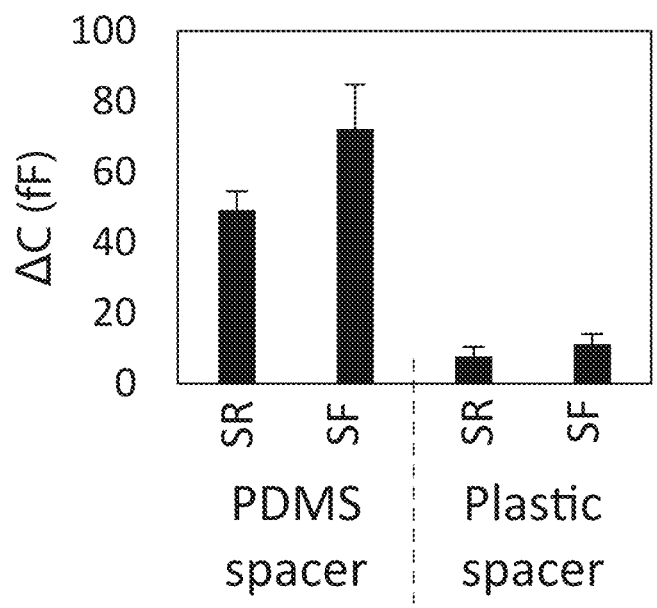
FIG. 3E is a graph comparison of $\Delta C$ with PDMS and plastic spaces in the setup of FIG. 3A, in accordance with the present technology.

FIG. 3E is a graph comparison of ΔC with PDMS and plastic spaces in the setup of FIG. 3A, in accordance with the present technology. On the horizontal axis is the type of sensor either on a polydimethylsiloxane (PDMS) spacer or a plastic spacer. On the vertical axis is the change of capacitance in fF. The capacitance increase in a metal cup was intriguing in that the small addition of 10 mL water volume could be detected in an electron-rich metal cup. We hypothesized that the ΔC increase could be attributed to the increase of either pressure or charge. The pressure increase of an SF sensor could increase conductance due to higher percolation, which could increase ΔC. To test the hypothesis, the 2 mm-thick spacers made of PDMS or plastic were fabricated (see FIG. 1A). Upon adding water, a PDMS spacer could be compressed, and subsequently, the capacitance would increase. Since a plastic spacer did not allow the contact with the sensor, ΔC of a plastic spacer should be resulted solely from electric charge. In the experiment, 10 mm-wide SF and SR electrodes were located under the center of either PDMS or plastic spacers. An initial volume of 20 mL was added to a metal cup to stabilize the charge. Subsequently, 250 mL was supplied; and the ΔC was measured.

From the PDMS spacer testing, the pressure clearly increased ΔC of both SR and SF sensors by 47 fF and 75 fF, respectively (N=6). In comparison to the pressure effect, ΔC of SR and SF sensors due to charge increase were only 3 and 8 fF, respectively. According to the test, ΔC in a metal cup could mainly result from the pressure. About 10% of ΔC was due to the increased charge from the 250 mL of water. To confirm the pressure effect, we placed a 290 g-porcelain container on top of an empty metal cup and observed a ΔC of 65 fF on a 10 mm-wide SF sensor. Overall, an SF sensor demonstrated a higher sensitivity and a larger charge-maintaining capability than an SR sensor. Additionally, an SF sensor showed the capability to detect both pressure and charge changes in a metal cup, which was a significant performance improvement in comparison to two-electrode capacitance sensors.

Figure 4A:
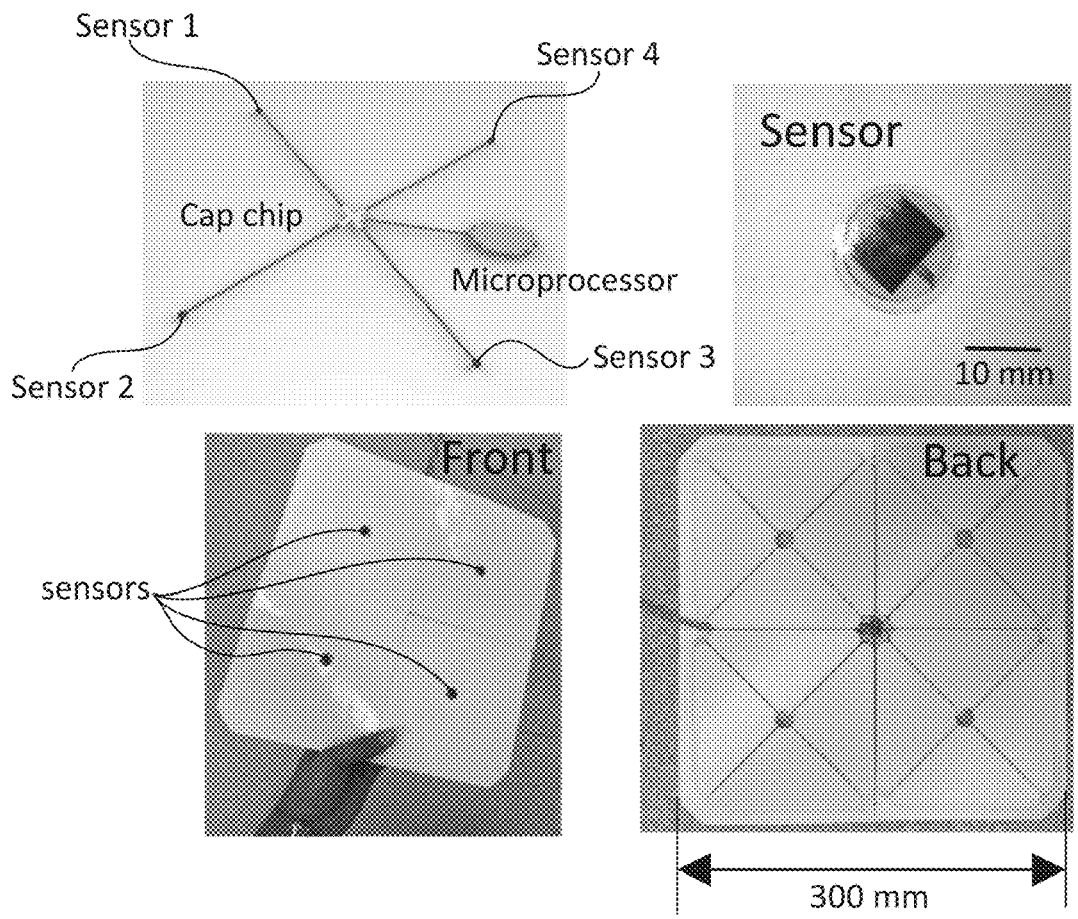
FIG. 4A is an example smart pad, in accordance with the present technology.

FIG. 4A is an example smart pad, in accordance with the present technology. In one example, a smart pad integrated with four sensors was designed and fabricated with a 3D printer. In some embodiments, four sensors were radially arranged on a 3D-printed plate. 10 mm-wide SF sensors are coated with a 20 μm-thick polyimide film and attached to a plastic surface. In a pad, the four sensors were connected to a capacitance-to-digital chip (FDC1004, Texas Instrument). The measurement data were transferred to a microprocessor (ATmega328PU) at a sampling frequency of 18 Hz. In some embodiments, the smart pad, or sensing pad, includes four sensors, wherein each of the four sensors is one of the sensors described herein, a capacitance-to-digital chip communicatively coupled to the four sensors and located in the center of the array, and four lobes extending from the capacitance-to-digital chip, wherein each lobe physically connects one of the four sensors to the capacitance-to-digital chip in the shape of an X. The smart pad incorporated with four SF sensors with a 10 mm width showed a similar proximity detection performance to the sensors of the testing setup, which was very unusual in consideration of parasitic capacitance.

Figure 4B:
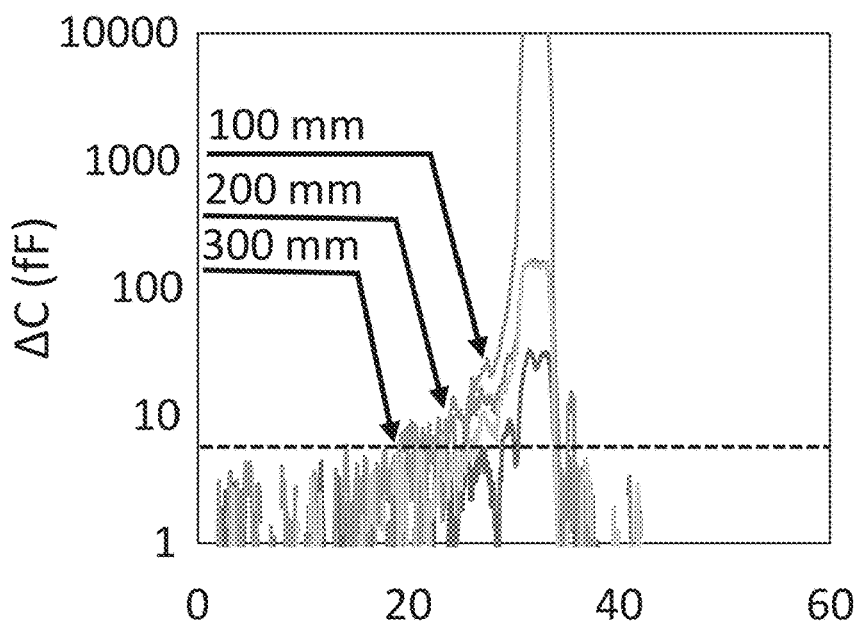
FIG. 4B is a hand proximity test in a logarithmic scale of the smart pad of FIG. 4A, in accordance with the present technology.

FIG. 4B is a hand proximity test in a logarithmic scale of the smart pad of FIG. 4A, in accordance with the present technology. On the horizontal axis is the time in seconds, and on the vertical is the change of capacitance in fF. The inset shows a linear scale between 10 and 30 s. The ΔC for the hand proximity from 400 to 0 mm followed by a finger force. The detectable range of the hand was 300 mm. Also fabricated was a board with four hybrid sensors, the detectable range decreased below 30 mm due to a parasitic capacitance.

Figures 4C, 4D:
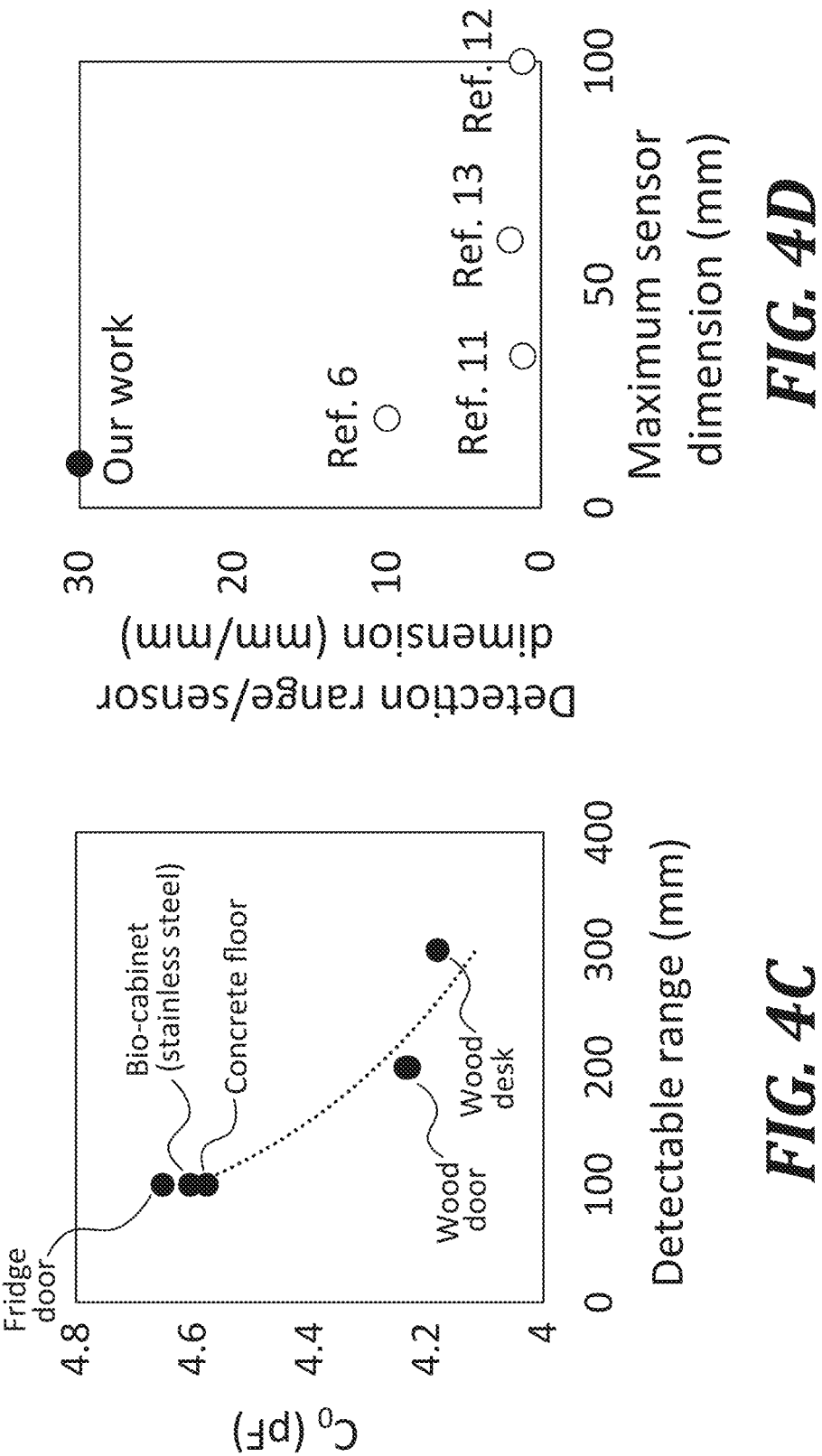
FIG. 4C is a graph of the relationship between C0 and a detectable range of a human hand of the smart pad of FIG. 4A, in accordance with the present technology.
FIG. 4D is a graph of the ration of a hand detection range to a maximum sensor dimension of the smart pad of FIG. 4A, in accordance with the present invention.

FIG. 4C is a graph of the relationship between C0 and a detectable range of a human hand of the smart pad of FIG. 4A, in accordance with the present technology. On the horizontal axis is the detectable range in millimeters, and on the vertical axis is $C_0$ in pF. The detectable range of the smart pad decreased in an electrically conductive environment. When the test was conducted on a wood table, the detectable range for the hand was 300 mm. As the environment changed to a door, concrete floor, a metal desk, and a bio-cabinet, the detectable range was changed to 150, 90, 50, and 50 mm, respectively. For a bio-cabinet testing condition, the smart pad was surrounded by four stainless steel plates. The detectable range of 50 mm was considered large.

FIG. 4D is a graph of the ration of a hand detection range to a maximum sensor dimension of the smart pad of FIG. 4A, in accordance with the present invention. On the horizontal axis is the maximum dimension of the sensor in mm, and on the vertical axis is the ratio between the detection range and the sensor dimension in millimeters. To analyze the smart pad, a numerical simulation was conducted by using COMSOL (FIG. 4D). In the numerical model, a square pad was divided by 16×16 dimensionless units. The sensors were in the center of each quadrant. An object was moved from 0.08 to 0.48 nondimensional units with 0.08 increment above the pad as the human hand. Subsequently, the object was moved in horizontal and vertical directions at each height in the 16×16 nondimensional area, with each unit in each axis. For example, the ΔC contour-map of a top-left sensor was shown in 2D and 3D formats. Since each sensor behaved in a similar manner, ΔC on the board was the superposition of capacitance distribution of four sensors, which was well-approximated by a Gaussian function. The following equation was used to fit the surface distribution of ΔC, $$f(x) = a \cdot \exp\left(-\left(\frac{(x-b)^2}{2c^2} + \frac{(y-d)^2}{2e^2}\right)\right) \quad (1)$$

where a was the measurement value from the sensor, b and d were the dimensions of each spot in the map, and c and e were the coefficients.

In the bottom image of FIG. 4D, the blue dots were the values from the simulation. The contour map shows the change in capacitance based on the location of an object. The contour map was plotted using the Gaussian equation, which agreed well with the numerical results. When ΔC was transferred to a laptop computer, the contour map for each sensor was calculated. Subsequently, the contour plots of four sensors were combined to produce the final real-time 3D contour map.

Figure 4E:
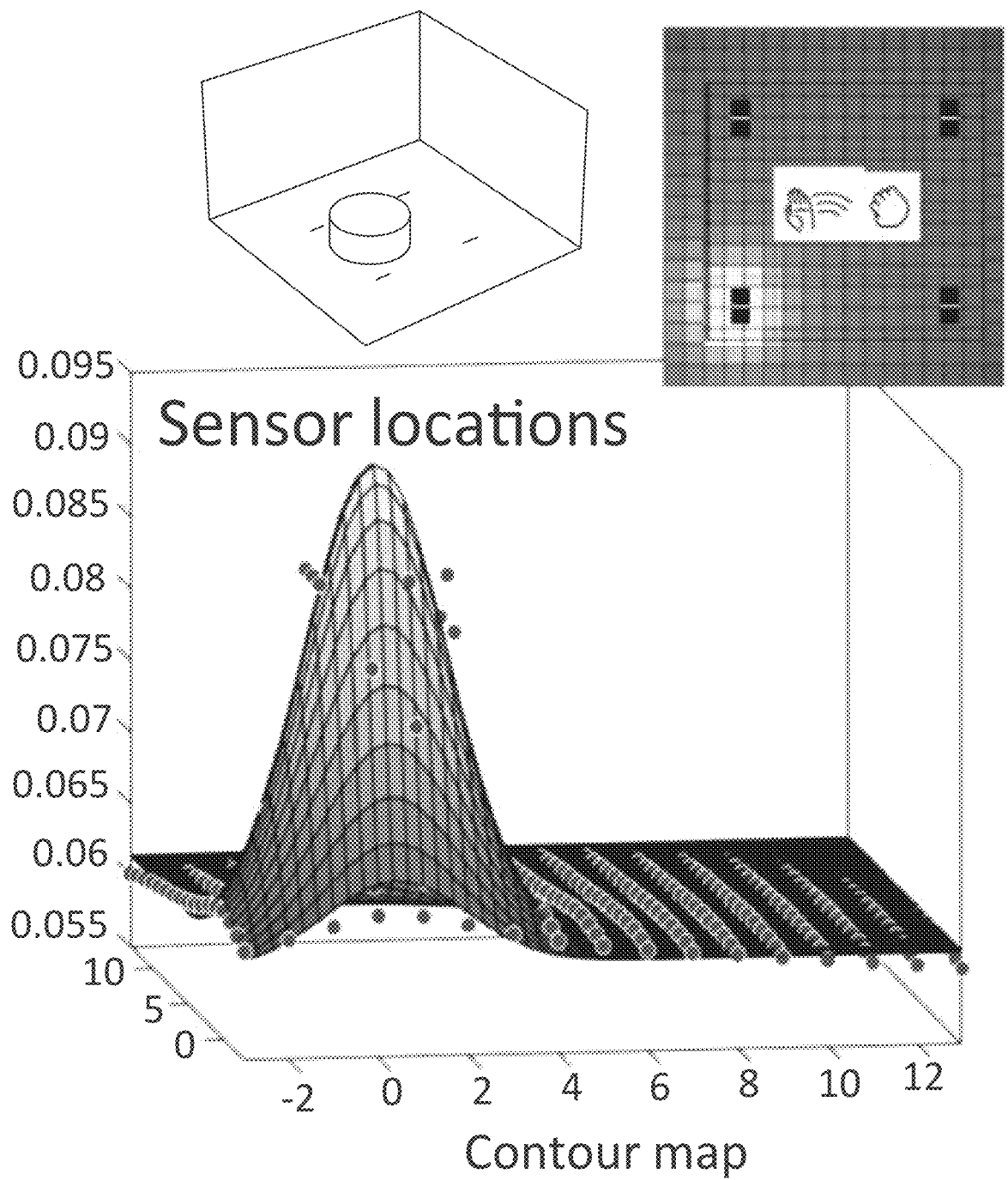
FIG. 4E is a numerical model of the smart pad of FIG. 4A, in accordance with the present technology.

FIG. 4E is a numerical model of the smart pad of FIG. 4A, in accordance with the present technology. FIG. 4E shows the application of the contour plot to monitor the stepping of a board on a concrete floor. When the foot with a shoe was placed on a board, the pressurized area was changed with a red color. When a board with two feet was stepped sequentially, the sensors showed ΔC for left and right feet. When two feet were removed, the capacitance values returned to the original value. Since the back foot left the plate earlier than the front foot, the capacitance signal for the front foot returned later than that for the back foot. Note that ΔC was only 400~500 fF range due to electrically insulated shoes and grounded concrete floor.

Figure 4F:
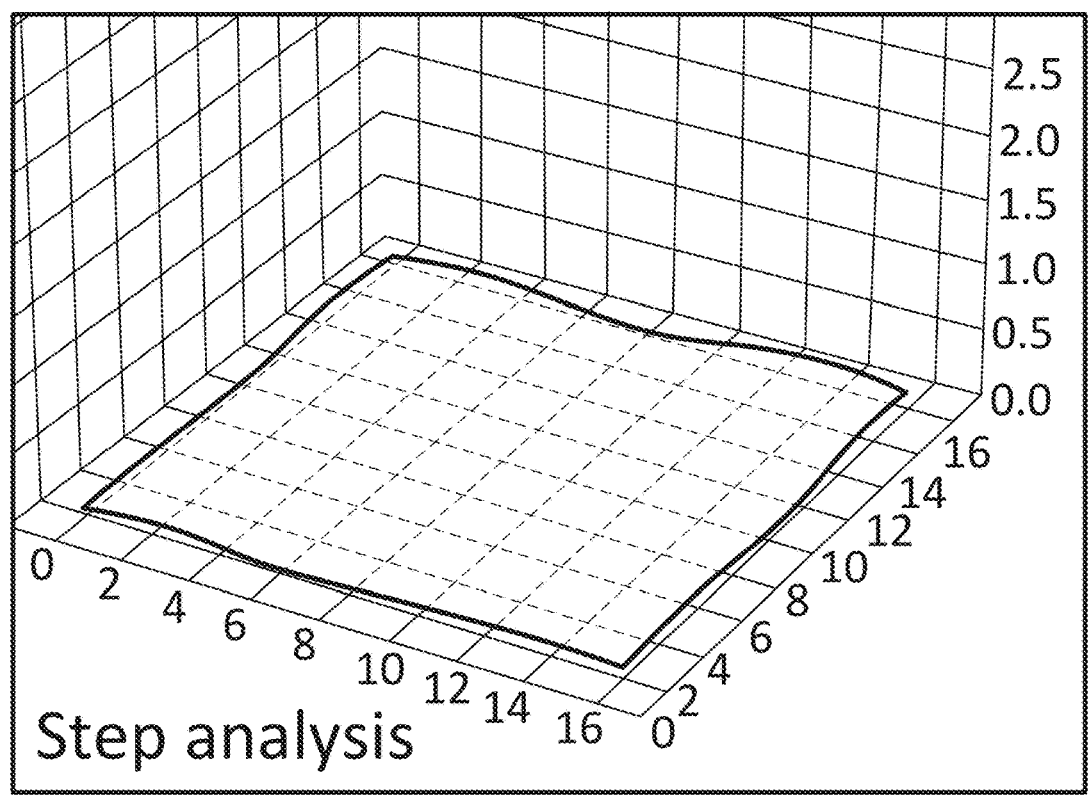
FIG. 4F is a graph of a step test for the smart pad of FIG. 4A, in accordance with the present technology.
Figure 4F:
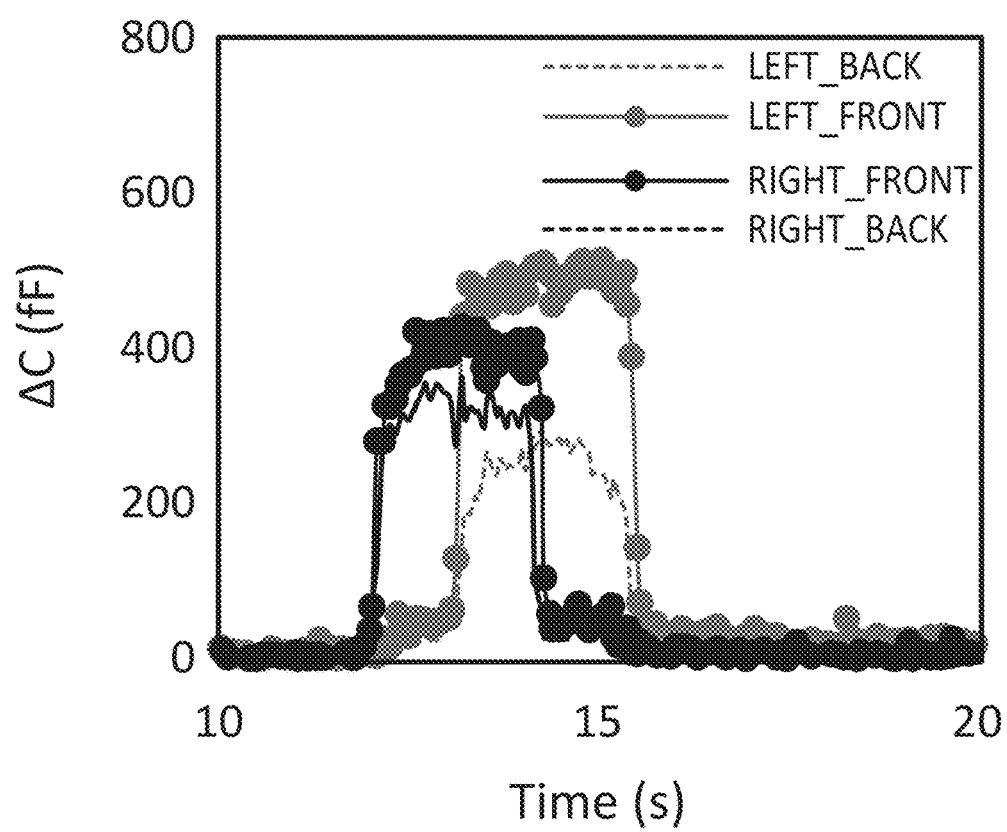

FIG. 4F is a graph of a step test for the smart pad of FIG. 4A, in accordance with the present technology. On the horizontal axis is the time in seconds, and on the vertical axis is the change in capacitance in pF. The stepping of the right and left feet was followed by leaving both feet. The contour map shows only the step of a right foot. The graph shows time profiles of ΔC. FIG. 4F shows ΔC for glass and metal cups with an addition of 300 mL water at a 100 mL increment. The contour plot in FIG. 4F shows the cup location and the response to water. For stable contact of a cup to a sensor, a 1 mm-thick PDMS plate was located on the sensor. The time-dependent graph in FIG. 4f shows ΔC for water supply to glass and metal cups. The ΔC here was $C_1-C_0$, where $C_0$ was the initial value before placing a cup. In a glass cup, the average ΔC values were 341, 415, and 442 fF for 100, 200, and 300 mL, respectively. In a metal cup, average ΔC values were 670, 688, and 709 fF. The average ΔC value for a metal cup for 100 mL was 19.5 fF. When 100 mL of water was converted to a pressure in a 70 mm-diameter metal cup, the pressure applied to a sensor was 254 Pa. Considering the amplitude of noise level (±5 fF), the detection limit of pressure was 64 Pa. In some embodiments, the four sensors are equidistant from one another, i.e. the four sensors are arranged in a square, the same distance from one another. In some embodiments, the sensors are up to 300 mm from one another.

To demonstrate the real-time response for human motion, the smart pad system was trained with a machine learning (ML) model with the time series data. In the test, the sampling rate was 18 Hz. The time window for each motion was 3 s, which was appropriate to conduct hand gesture recognition. Using the ML model, hand motion was classified using time-dependent data. The motion of moving a hand from left to right ('left') or the other way ('right') was performed above the pad with a repetition of 30 times. Also, hand grabbing was performed in the same way. A reference signal was obtained without hand intervention.

Figure 4G:
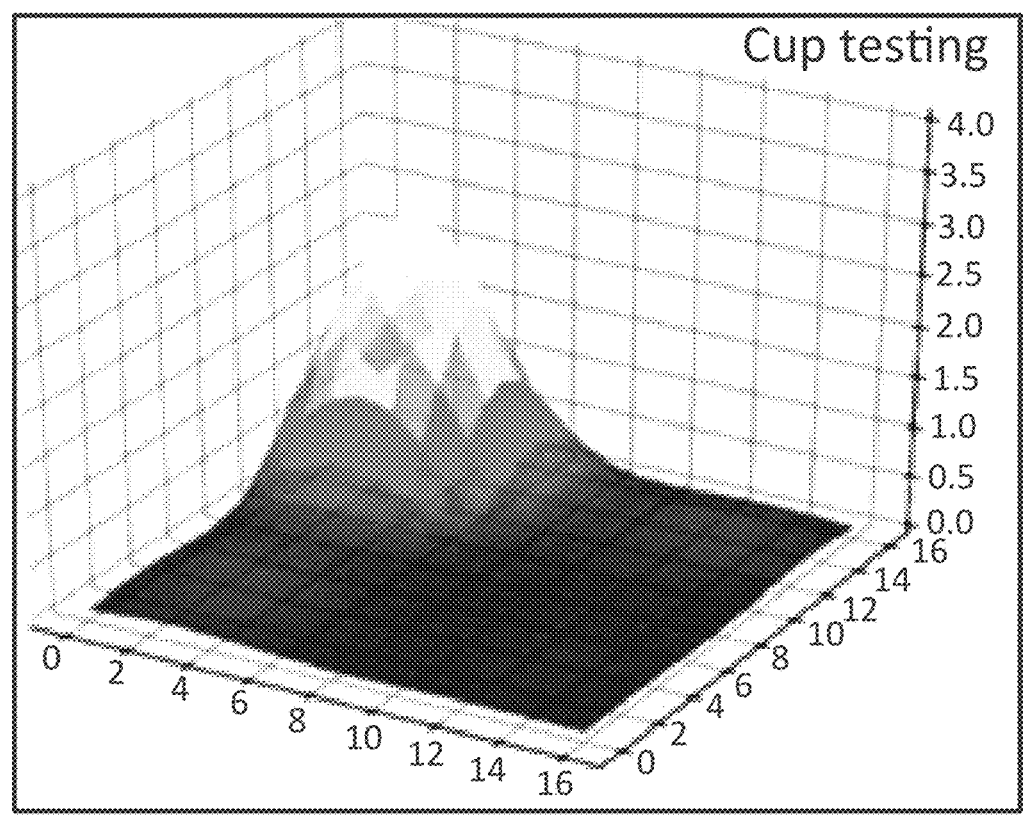
FIG. 4G is an example graph showing water supply to glass and metal cups (100 mL each) using the smart pad of FIG. 4A, in accordance with the present technology.
Figure 4G:
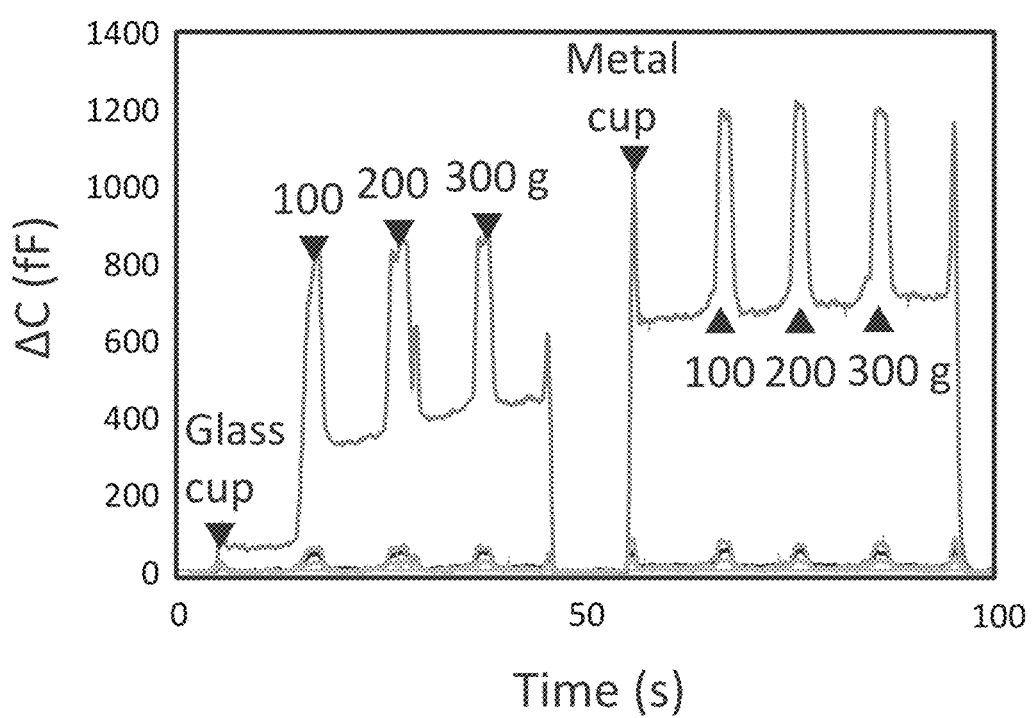

FIG. 4G is an example graph showing water supply to glass and metal cups (100 mL each) using the smart pad of FIG. 4A, in accordance with the present technology. FIG. 4G shows the capacitance values of four sensors showing the noise level of ±5 fF. The four sensors showed an average capacitance of 4.117±0.056 pF, demonstrating 1.4% of the variation in the assembly. The capacitance signals for left-right motion and grabbing showed the distinguishable pattern for each gesture. The collected data were transferred to an ML model package (Sktime) for the classification of time-series data. After completing the training, the model was applied to a real-time classification of hand motion. On the horizontal axis is the time in seconds, and on vertical axes is the capacitance in pF.

Figure 4H:
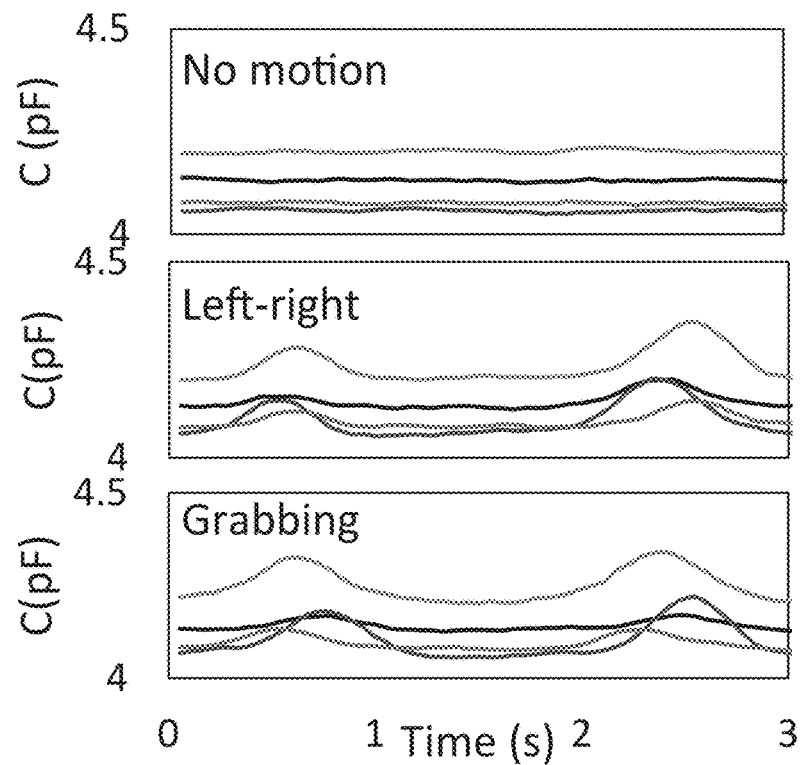
FIG. 4H is a series of graphs showing capacitive changes for C without motion, left-right movement, and grabbing of a hand on the smart pad of FIG. 4, in accordance with the present technology.

FIG. 4H is a series of graphs showing capacitive changes for C without motion, left-right movement, and grabbing of a hand on the smart pad of FIG. 4, in accordance with the present technology. On the horizontal axis is the time in seconds. On the vertical axis is the capacitance in pF. The preparation of fibrous electrodes was adapted from our previous report. In short, cellulosic pulp suspension pre-adsorbed with cationic polyacrylamide (CPAM, Percol 3035; BASF, RP, DE) was mixed with 10 wt. % MWCNTs (Cheap Tubes Inc., VT, U.S.A.) dispersed in aqueous sodium dodecyl sulfate (Sigma Aldrich, MO, U.S.A.). The mixture was subsequently filtered, pressed, and dried to form electrically conductive carbon nanotube paper composites (CPC), which were then used to fabricate fibrous electrodes by controlled water-printing and stretching (FIG. 1F). Silver paste (MG Chemicals, USA) was applied and cured to both ends of CPC strips with various widths (i.e., 1, 3, 5, and 10 mm) (FIG. 1G). Deionized water was printed three times using a 0.8 mm-diameter capillary pen to tailor the fracture location, and PF electrodes were produced by stretching the water-printed strip. In some embodiments, the sensor is fabricated by applying a unidirectional tensile force to a composite substrate wherein a plurality of insulating fibers aligns along the tensile force and bulging with out-of-plane direction at the site of a tensional tear, wherein the precursor composite substrate comprises a composite substrate comprising a template material wherein the template material comprises a plurality of insulating fibers, and a plurality of carbon nanotubes bonded to the insulating fibers forming a nanotube coating on the insulating fibers, and an electrode coupled to the nanotube coating on the site of the tear, such that an electrical signal passes through the plurality of junctions at the site of the tear.

For electric connection, silver ink was uniformly coated on a 100 μm-thick PET film. The film was trimmed to a 1 mm-wide strip, which was used for electrical connection to sensors. A capacitance-to-digital chip (FDC 1004, Texas Instruments) was coupled with a microprocessor (ATmega328PU) for digital signal collection (FIG. 1h). The operation frequency of a chip was 25 kHz.

Using fibrous and rectangular electrodes, five kinds of capacitive sensors were fabricated: PF, PH, PR, SF, and SR sensors (FIG. 1A). For initial proximity testing, the sensors were attached on 1 mm-wide silver electrodes for consistency (FIG. 2A). The sensor was covered with a 100 μm-thick PET film to avoid direct contact with a human hand. For a pair of electrodes, the gap was 1 mm (g=1 mm). A human hand was moved for a distance of 300, 200, 160, 120, 80, and 40 mm from sensors. Since a single electrode sensor showed a higher sensitivity, the sensors of different widths (1, 3, 5, and 10 mm) were characterized for a hand proximity test.

Below 40 mm, a finger test was conducted for SF and SR sensors with 10 mm width (FIG. 2D). To characterize the response to a finger force, SR and SR sensors were installed on an acrylic plate. The plate was located on a 3D-printed PLA plate that was integrated with a load cell to measure finger force. As soon as a finger touched the surface with a measurable load of 0.01 N, the capacitance was measured for both single fibrous and rectangular sensors.

To characterize the efficacy of a SF sensor in comparison to a SR sensor, 10 mm-wide fibrous electrodes and 10 mm-wide rectangular electrodes were fabricated (N=6). The initial capacitance values were measured without sensors for comparison. Without 10 mm-SF and SR sensors, the 1 mm-wide silver wire for electric connection was used to be considered a SR-1 mm sensor. The capacitance change was measured at the distance of 300, 200, 100, and 0 mm followed by the finger contact at 2 N-force with N=6 (FIG. 2g).

Figure 4I:
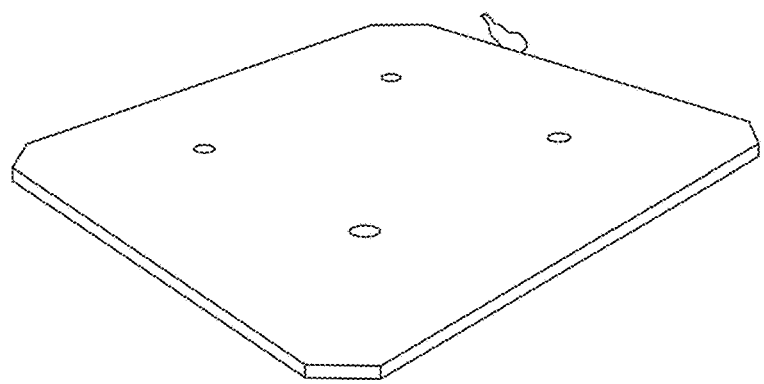
FIG. 4I is a photo showing gesture recognition for A and B of the smart pad of FIG. 4A, in accordance with the present technology.

FIG. 4I is a photo showing gesture recognition for A and B of the smart pad of FIG. 4A, in accordance with the present technology.

Figure 4J:
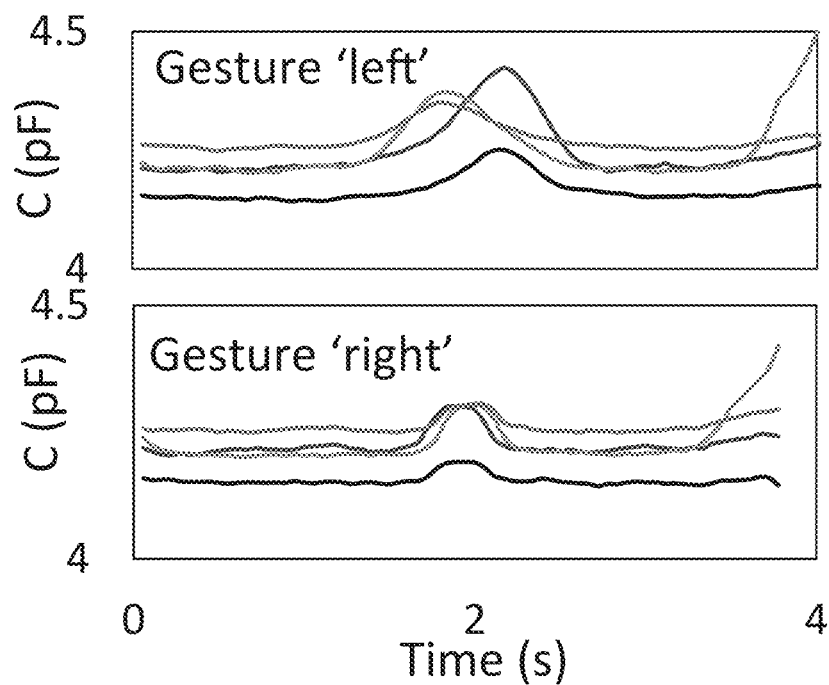
FIG. 4J is a series of graphs showing the time profile of C for gestures 'left' and 'right' of the smart pad of FIG. 4A, in accordance with the present technology.
Figure 4K:
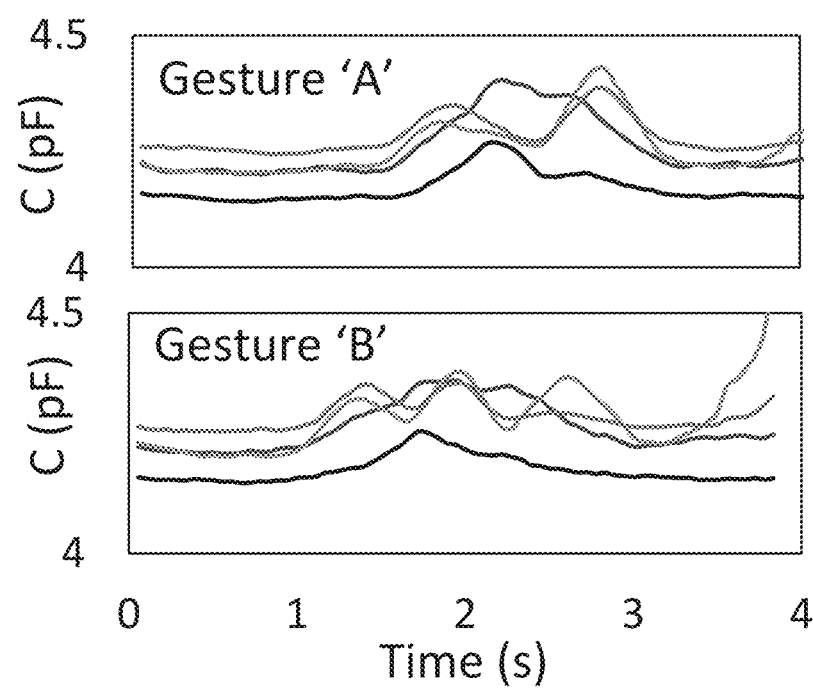
FIG. 4K is a series of graphs showing the time profile of C for gestures 'A' and 'B' of the smart pad of FIG. 4A, in accordance with the present technology.

FIG. 4J is a series of graphs showing the time profile of C for gestures 'left' and 'right' of the smart pad of FIG. 4A, in accordance with the present technology. FIG. 4K is a series of graphs showing the time profile of C for gestures 'A' and 'B' of the smart pad of FIG. 4A, in accordance with the present technology. On the horizontal axes is the time in seconds, and on the vertical axes is the capacitance is pF.

Ultrasensitive capacitive sensors composed of nanostructured fibrous electrodes were demonstrated for the human-machine interface. In the numerical analysis, the capacitive sensitivity could be increased by decreasing the initial capacitance using a smaller area electrode and increasing the final capacitance using a fibrous electrode. Based on the sensing mechanism, five configurations of capacitance sensors were characterized as; paired rectangular, paired fibrous, paired hybrid, single rectangular, and single fibrous electrodes. Among them, a single fibrous electrode showed the highest sensitivity to a hand proximity test, which was validated by experiment. Using 10 mm single fibrous electrodes, the detectable range of the human hand was 300 mm, which was one of the largest detection ranges among capacitive sensors. In spite of the irregular shape of fibrous electrodes, the initial capacitance value could be controlled by 0.4% because the capacitance value was saturated with the increased number of fibers. For human finger detection, as a finger moved from 300 mm to 0 mm and pressed a sensor with 2N, the capacitance exponentially increased. For water measurement, water could be measured using a 10 mm-wide single fibrous electrode in both glass and metal cups. According to this characterization, the water measurement in a metal cup was dominated by pressure transferred to a sensor. The ~10% of capacitance change resulted from charge increase. The detection limit of water pressure in a metal cup was 64 Pa due to the improved capacitance of pressurized conductive fibers. A smart pad could be constructed to recognize human behavior using a machine learning algorithm in real-time. The ultrasensitive capacitive sensor facilitates the delicate detection of human behavior, environmental change, manufacturing process, and safety control.

Figure 5:
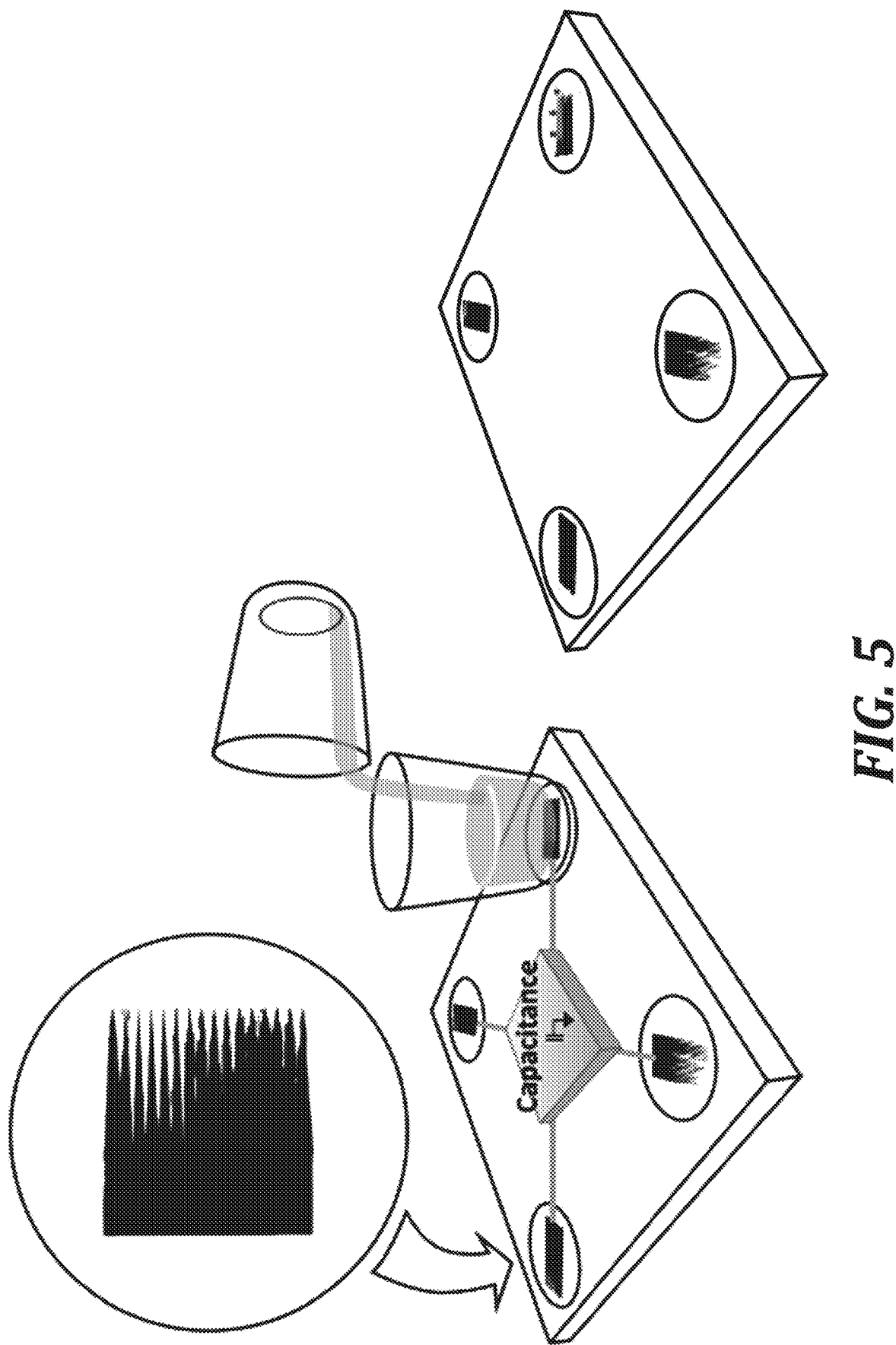
FIG. 5 is an example smart pad in accordance with the present technology.

FIG. 5 is an example smart pad in accordance with the present technology. To analyze the capacitive response of a liquid object, water volume was measured in glass and metal cups using SF sensors. Water volume was added to cups from 0 to 30 mL by an increment of 10 mL. SF sensors with 1, 3, 5, and 10 mm widths were tested. To analyze the sensing mechanism of a metal cup, two kinds of 2 mm-thick spacers were prepared. One was a non-compressible C-shaped ring to protect a sensor from direct contact with a cup (FIG. 3A). The other was a compressible spacer made of polydimethylsiloxane (PDMS). In both electrodes, the contact between silver electrodes and sensor was not pressed to avoid the effect of contact capacitance. Using both spacers, the charge and pressure effects were analyzed for water sensing. Both 10 mm-wide SF and SR electrodes were used for comparison. In the experiment, 20 mL of water was supplied to a metal cup, followed by the supply of 250 mL. The experiment was repeated six times. In some embodiments, the sensor can detect liquid volume, liquid flow rate, and liquid induced pressure based on a change in electric charge. In some embodiments, the sensor can detect liquid leak in a container or pipe, pipe pressure, pipe flow rate, faucet water, toilet water, sink water, etc. In some embodiments, the container or pipe is metallic. In some embodiments, the container or pipe is non-metallic.

The study related to a human finger or a hand was approved by the institutional review board (IRB) at University of Washington (IRB ID: STUDY00013761). The sensor characterization was conducted according to the approved procedure under the consent of the study participants.

Figure 6A:
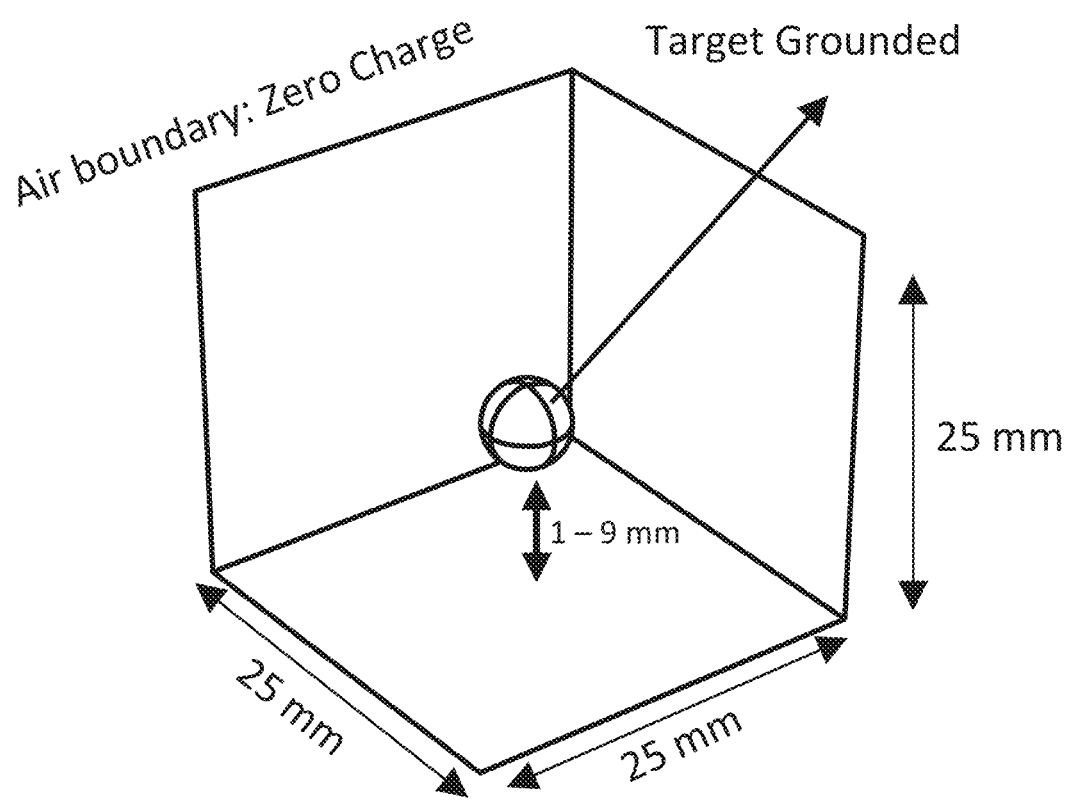
FIG. 6A is a domain setup of numerical analysis for example sensors, in accordance with the present technology.

FIG. 6A is a domain setup of numerical analysis for example sensors, in accordance with the present technology. A COMSOL numerical model was built to study the proximity sensitivity of a capacitive sensor. FIG. 6A shows the geometry of a spherical object and paired electrodes for capacitive detection. Capacitive sensors were placed at the bottom of a square domain with air permittivity. One side was 25 mm. The potential of 5V was applied between two electrodes. The capacitive sensors were made of paired rectangular (PR), paired fibrous (PF), and paired hybrid (PH) electrodes (FIGS. 6B, 6C, and 6D, respectively).

Figure 6B:
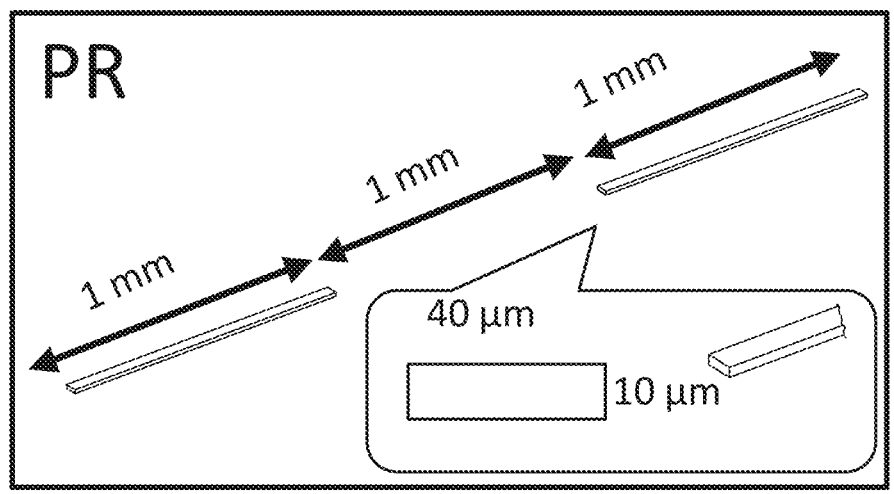
FIG. 6B is a paired rectangular electrode configuration, in accordance with the present technology.
Figure 6C:
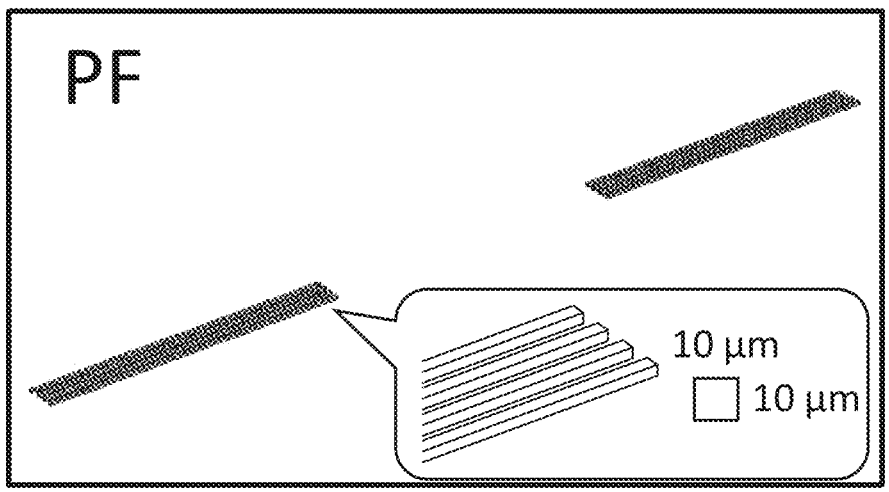
FIG. 6C is a paired fibrous electrode configuration, in accordance with the present technology.
Figure 6D:
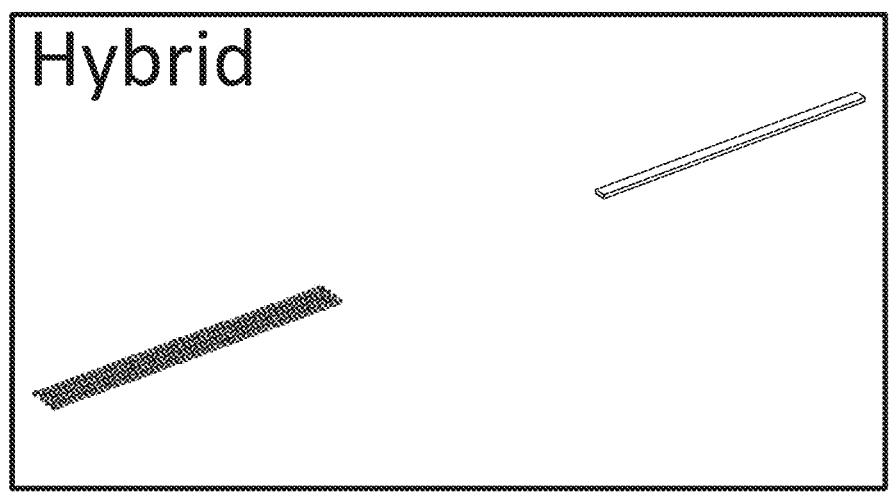
FIG. 6D is a hybrid electrode configuration, in accordance with the present technology.

FIG. 6B is a paired rectangular electrode configuration, in accordance with the present technology. FIG. 6C is a paired fibrous electrode configuration, in accordance with the present technology. The inter-electrode gap is 20 µm wide. FIG. 6D is a hybrid electrode configuration, in accordance with the present technology.

Three different types of geometries were compared to study capacitive sensitivity to proximity detection of a charged object. For all the electrodes, the total volume was designed to be the same. The rectangular electrode was represented by a monolithic rectangular slab with has a cross-section of 40×10 µm$^2$ with 1 mm in length. The geometry of the fibrous electrode was created by placing four parallel rectangular fibers at 20 µm apart. Each electrode had 10×10 µm$^2$ in cross-section and 1 mm in length. For hybrid electrodes, 5V was applied to the fiber side while the rectangular electrode was grounded. A 100 kHz frequency was applied for an electrostatic model. The sphere had a dielectric constant of 80. For all configurations, the gap size was 1 mm. The 5 mm-diameter target represented a capacitive sensing target floating in the center.

The observed capacitance was calculated from the imaginary part of the admittance, which is:

$$C = \frac{imag(Y_{11})}{\omega}$$

The symbol Y is the observed admittance at an electrode, and the ω is the excitation radian frequency, which is 200n k rad/s.

Figure 7:
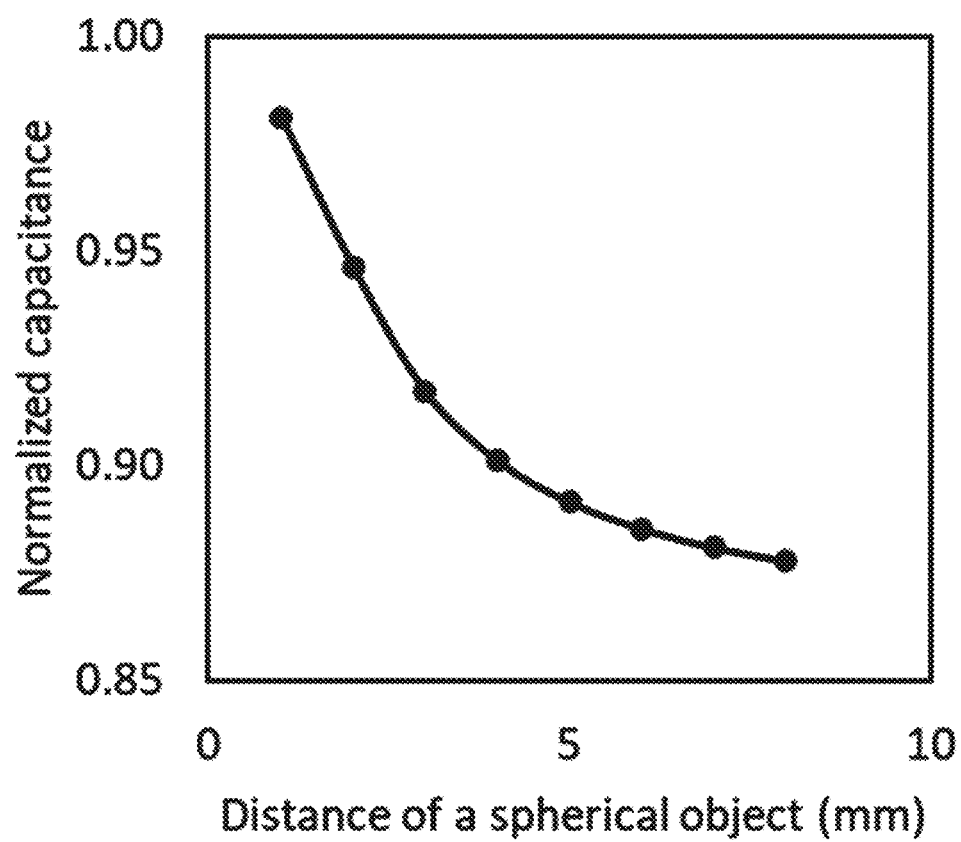
FIG. 7 is a graph of a portion of a capacitance between a sensing electrode and a spherical object out of the total capacitance; in accordance with the present technology.

FIG. 7 is a graph of a portion of a capacitance between a sensing electrode and a spherical object out of the total capacitance; in accordance with the present technology. On the horizontal axis is the distance of a spherical object in mm. On the vertical axis is the normalized capacitance. The normalized ratio of the capacitance between a sensing electrode and a spherical object out of the total capacitance is illustrated in FIG. 7.

Using the capacitance model in FIG. 7, the normalized ratio of the capacitance between a sensing electrode and a spherical object was computed out of the total capacitance. According to the graph, when the distance of a spherical object to a capacitive sensor was between 1 and 8 mm, the capacitance between a sensing electrode and a spherical object occupied 87.8~98.1% of the total capacitance. For conductance measurement of cellulose fibers embedded with carbon nanotubes, untangled cellulose fibers in a fractured CPC were electrically connected by adding silver paste on both ends. A Fluke meter was used to measure the resistance, which was converted into conductivity based on the geometry.

Figure 8A:
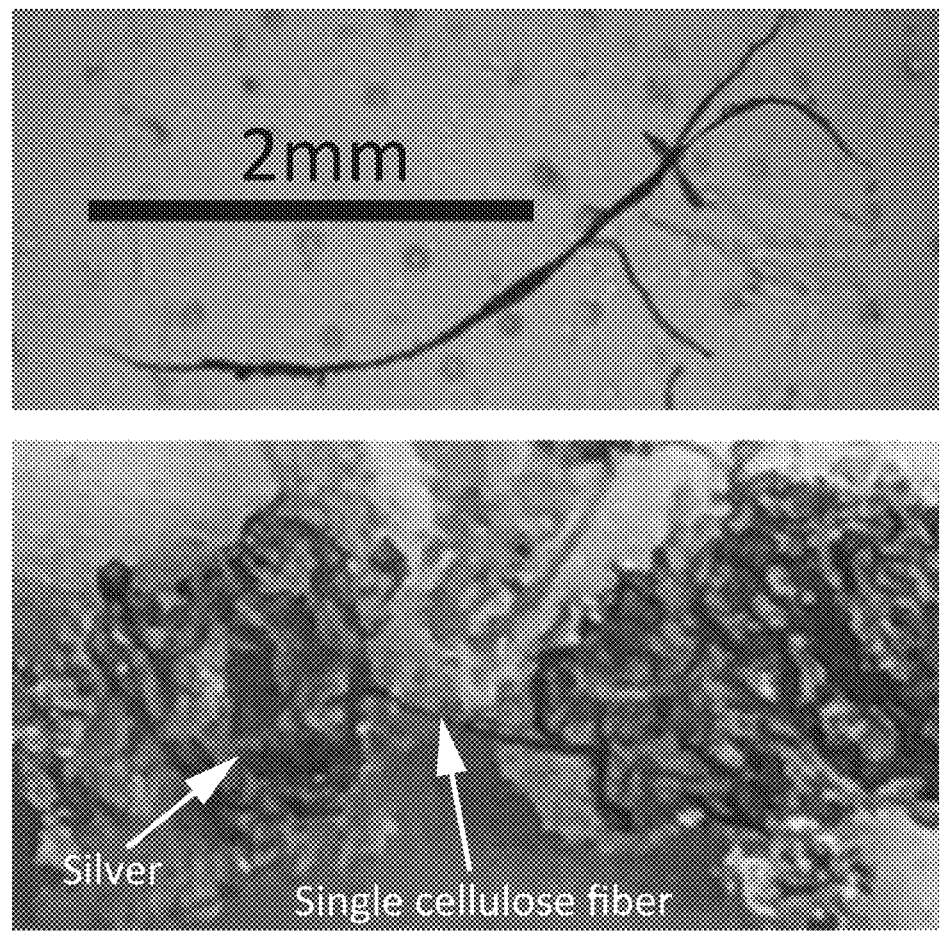
FIG. 8A is a photograph of fractured fibers, in accordance with the present technology.

FIG. 8A is a photograph of fractured fibers, in accordance with the present technology. According to optical microscope observations, the average length of the fiber was 1.71±0.4 mm, the linear density of fibers was 14.5±3.6 per mm, and the thickness of fibers was 5.9±1.6 μm (see FIG. 8A). The aspect ratio of length/thickness ranged from 200 to 490.

Figure 8B:
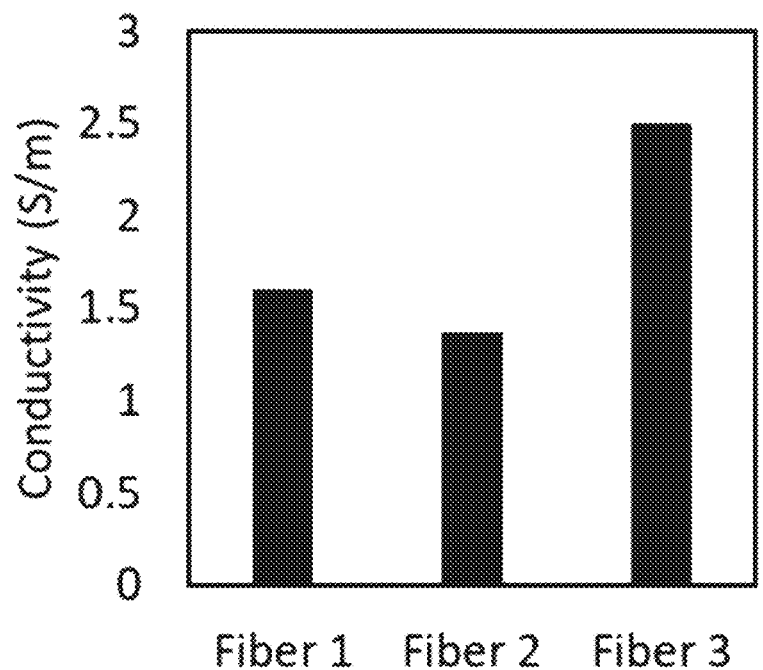
FIG. 8B is a graph of distribution of fiber conductivity, in accordance with the present technology.

FIG. 8B is a graph of distribution of fiber conductivity, in accordance with the present technology. On the horizontal axis is each fiber (fiber 1, fiber 2, and fiber 3), and on the vertical axis was the conductivity in S/m.

Figure 8C:
FIGS. 8C-8D are optical microscope images showing the fibers of an example fractured capacitance sensor, in accordance with the present technology.
Figure 8D:
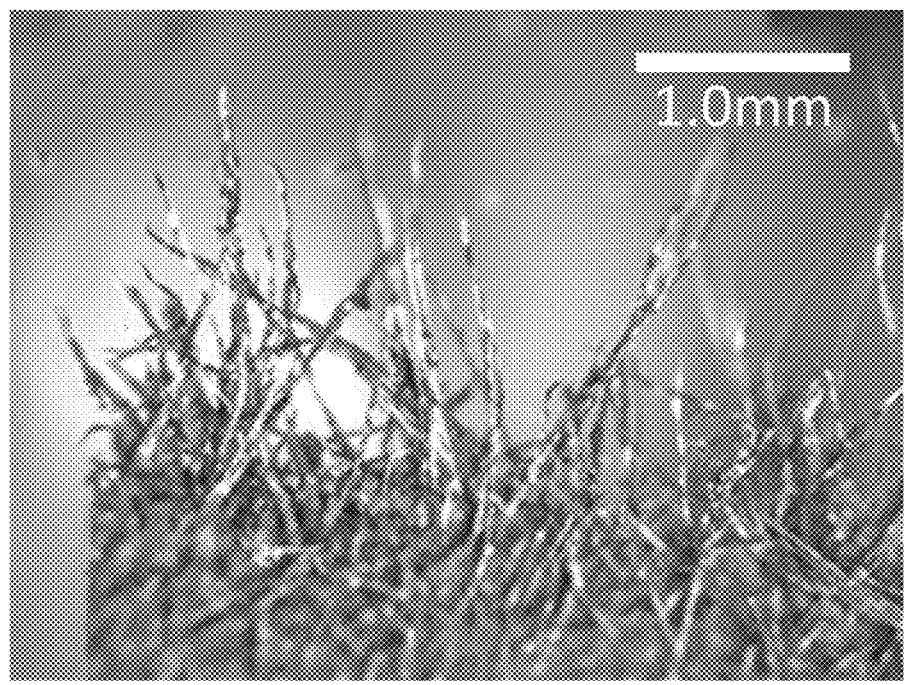
Figure 8E:
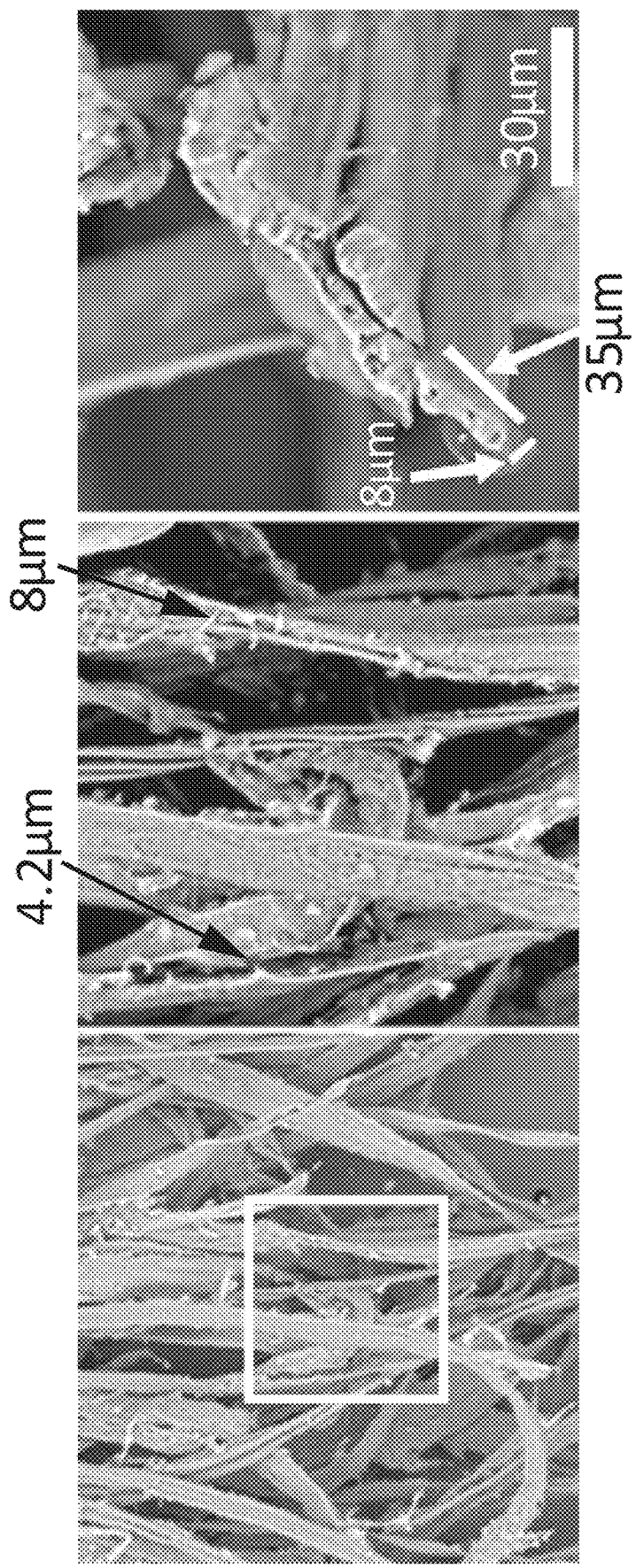
FIG. 8E is a scanning electron microscope image showing the thickness of slab-shaped fibers coated with multiwalled carbon nanotubes, in accordance with the present technology.

FIGS. 8C-8D are optical microscope images showing the fibers of an example fractured capacitance sensor, in accordance with the present technology. FIG. 8E is a scanning electron microscope image showing the thickness of slab-shaped fibers coated with multiwalled carbon nanotubes, in accordance with the present technology.

Figure 8F:
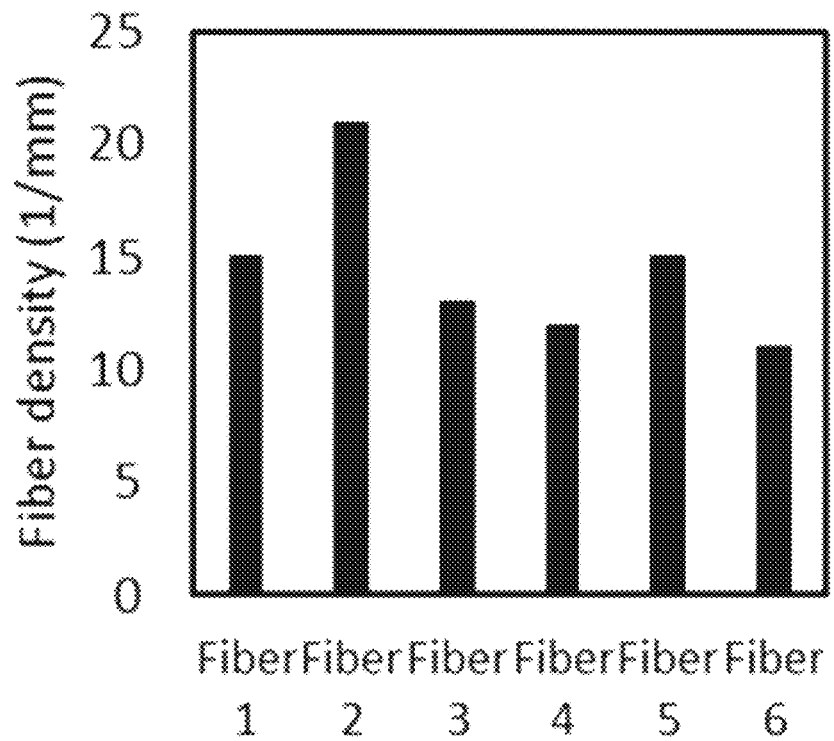
FIGS. 8F-8H are graphs of the distribution of fiber lengths, the distribution of linear fiber density, and the distribution of fiber thickness, respectively, in accordance with the present technology.
Figure 8G:
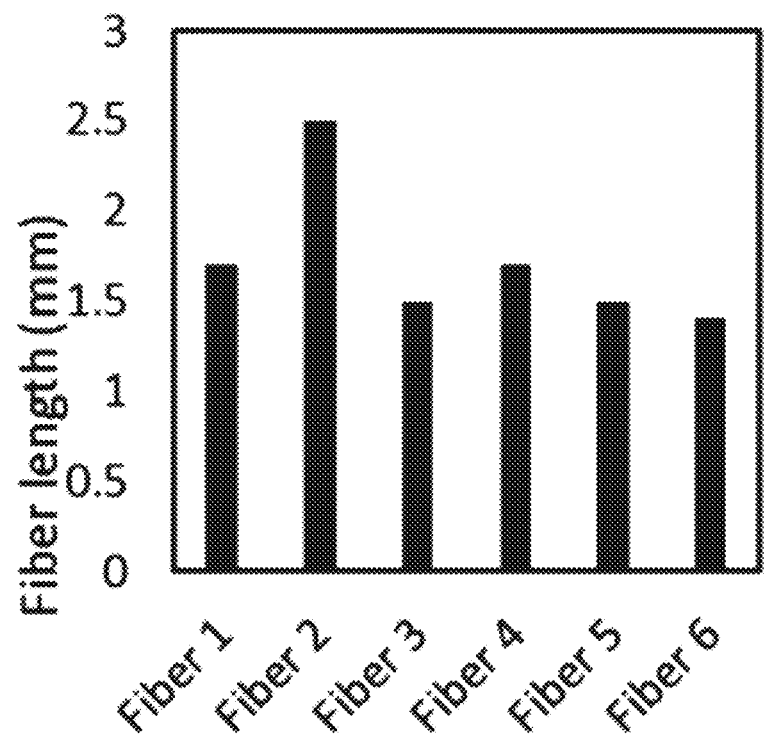
Figure 8H:
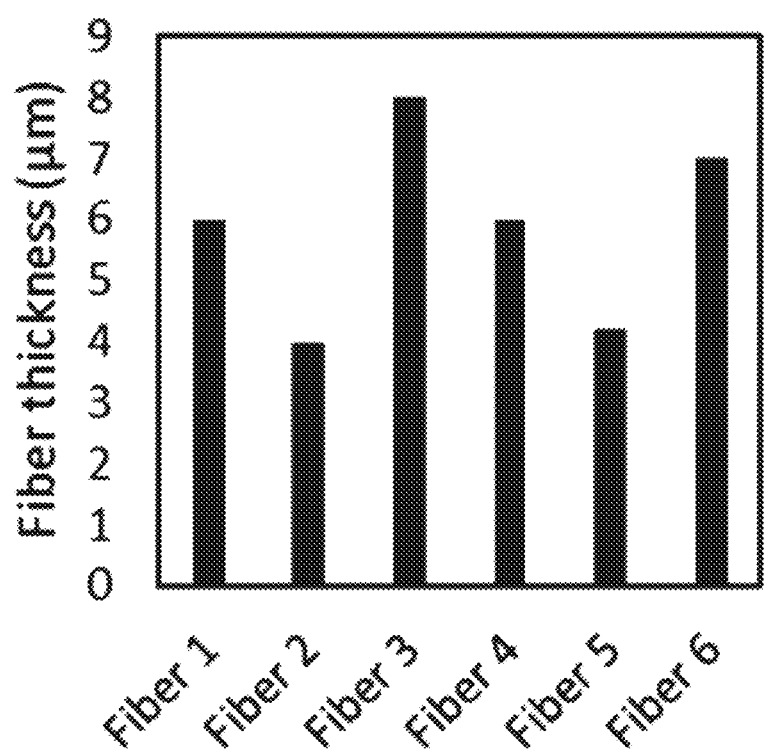

FIGS. 8F-8H are graphs of the distribution of fiber lengths, the distribution of linear fiber density, and the distribution of fiber thickness, respectively, in accordance with the present technology. On the horizontal axes of each is the individual number of fibers (fibers 1-6). In FIG. 8F, on the vertical axis is the fiber length in mm. In FIG. 8G, on the vertical axis is the fiber density in 1/mm. In FIG. 8H, on the vertical axis in the fiber thickness in μm.

FIGS. 9A-9B are numerical simulation for capacitance depending on the number of fibers, four and six, respectively, in accordance with the present technology, and FIG. 9C is a graph showing the $C_0$ of example sensors under different fiber counts, in accordance with the present technology.

Using COMSOL Multiphysics, the capacitance was measured for a pair of fibrous electrodes depending on the fiber number (FIG. 8F-H). When the fiber number was greater than 6, the capacitance increase reduced rapidly. In some embodiments, there are at least five insulating fibers per millimeter along the tear of the composite substrate.

TABLE 1

| Type | Materials | ΔC (fF) |
|---|---|---|
| PR | Both trimmed silver | 42.8 ± 8.5 |
| PF | Both fractured CPC | 78 ± 6.2 |
| PH | One trimmed silver, One fractured CPC | 109 ± 11.1 (excitation on a silver electrode) 78.6 ± 8.1 fF (excitation on a fiber electrode) |
| SR | One trimmed silver | 171 |
| SF | One fractured CPC | 246 |

Table 1 shows the sensor types, material composition, and capacitance change from 40-300 mm hand sensor distance, as described herein.

TABLE 2

| Type | Tests | Empirical Equation |
|---|---|---|
| SF-10 mm | Proximity 300 to 40 mm | $\Delta C$ (pF) = 313.8 * $x^{-1.929}$ (x in mm) |
| SF-10 mm | Linearized ΔC/ΔF after reading stabilizes (0.04-1.5N) | $\frac{\Delta C}{\Delta F} = 1.566$ pF/N |
| SR-10 mm | Linearized ΔC/ΔF after reading stabilizes (0.04-1.5N) | $\frac{\Delta C}{\Delta F} = 0.3429$ pF/N |

Table 2 showed empirical equations for 10 mm wide SF and SR sensors for hand proximity and finger press tests, as described herein.

The embodiments of the invention in which an exclusive property or privilege is claimed are defined as follows:

1. A capacitive sensor comprising:
   an electrically conductive a composite substrate including a plurality of insulating fibers and a plurality of carbon nanotuhes bonded to and/or embedded within the insulating fibers to define coated fibers, wherein at least a portion of the composite substrate is a torn edge, the torn edge induced by a unidirectional tensile force to the composite substrate, wherein a plurality of coated fibers at the torn edge align along the direction of the tensile force and expand in an out-of-plane direction, wherein the plurality of coated fibers is at least five insulating fibers per millimeter of the composite substrate, wherein the composite substrate includes a single electrode coupled to the coated fibers at the torn edge, such that the single electrode is configured to receive an electrical signal through the coated fibers at the torn edge, wherein a distance between the single electrode and a secondary electrode determines a spherical radius for a proximity sensing range.

2. The sensor of claim 1, wherein when the unidirectional tensile force is applied to the composite substrate the coated fibers are compressed along a width direction perpendicular to the tensional direction and expanded out of plane with buckling to align fibers along tensional direction.

3. The sensor of claim 1, wherein a liquid is deposited on the composite substrate before inducing the tear.

4. The sensor of claim 1, wherein the composite substrate is between 1-10 mm wide.

5. The sensor of claim 1, wherein each of the plurality of insulating fibers has an aspect ratio greater than 10, wherein the aspect ratio is either the length to diameter, the length to thickness, or the length to width.

6. The sensor of claim 1, wherein the plurality of carbon nanotubes is 1-20 wt % of the composite substrate.

7. The sensor of claim 1, wherein the composite substrate includes at least six insulating fibers per millimeter at the torn edge.

8. The sensor of claim 1, wherein the capacitive sensor is configured to interact with a secondary electrode located at least 3 mm from the single electrode.

9. The sensor of claim 8, wherein the secondary electrode has a surface area that is smaller than the surface area of single electrode.

10. The sensor of claim 8, wherein the secondary electrode is embedded or attached to an electrically charged target object.

11. The sensor of claim 10, Wherein the target object is a tissue of an animal.

12. The sensor of claim 10, wherein the capacitive sensor is configured to detect an object as a secondary electrode and electrically bridges the single electrode to the object.

13. The sensor of claim 1, wherein the sensor is used to measure the change of at least one electric charge with a minimum number of 1,000 electrons or their equivalent charge.

14. The sensor of claim 1, wherein the sensor is configured to detect a liquid level, a liquid volume, a liquid area, a liquid flow rate, a liquid induced pressure, or a liquid leak based on a change in electric charge.

15. A sensing pad comprising:
   four sensors, wherein each of the four sensors is a a capacitive sensor comprising an electrically conductive a composite substrate including a plurality of insulating fibers and a plurality of carbon nanotubes bonded to and/or embedded within the insulating fibers to define coated fibers, wherein at least a portion of the composite substrate is a torn edge, the torn edge induced by a unidirectional tensile force to the composite substrate, wherein a plurality of coated fibers at the torn edge align along the direction of the tensile force and expand in an out-of-plane direction, wherein the composite substrate includes a single electrode coupled to the coated fibers at the torn edge, such that the simile electrode is configured to receive an electrical signal through the coated fibers at the torn edge, wherein a distance between the single electrode and the a secondary electrode determines a spherical radius for a proximity sensing range, and wherein the four sensors are arranged in a 2×2 sensor array;
   a capacitance-to-digital chip communicatively coupled to the four sensors and located in the center of the array; and
   four lobes extending from the capacitance-to-digital chip, wherein each lobe physically connects one of the four sensors to the capacitance-to-digital chip in the shape of an X.

16. The sensing pad of claim 15, wherein the four sensors are equidistant from one another.

17. The sensing pad of claim 16, wherein the four sensors are 1-300 mm apart from one another.

18. The sensing pad of claim 15, wherein the sensing, pad further comprises a plate configured to house the sensor array.

19. The sensing pad of claim 15, wherein the sensing pad further comprises a microprocessor coupled to the capacitance-to-digital chip.

20. The sensing pad of claim 15, wherein the sensing pad is used for gesture recognition, body signal monitoring, respiratory monitoring, gait monitoring, human-machine interface, robot training and control, or manufacturing control.

* * * * *